(12) United States Patent
Seok et al.

(10) Patent No.: US 10,345,115 B2
(45) Date of Patent: Jul. 9, 2019

(54) TERMINAL DEVICE, VEHICLE, PERSONAL MOBILITY DEVICE, METHOD FOR CONTROLLING THE TERMINAL DEVICE AND METHOD FOR CONTROLLING THE VEHICLE

(71) Applicant: Hyundai Motor Company, Seoul (KR)

(72) Inventors: Donghee Seok, Seoul (KR);
Jeong-Eom Lee, Yongin-si (KR); Ga Hee Kim, Seoul (KR); Seona Kim, Seoul (KR); HeeJin Ro, Seoul (KR); Dongsoo Shin, Suwon-si (KR)

(73) Assignee: Hyundai Motor Company, Seoul (KR)

(*) Notice: Subject to any disclaimer, the term of this patent is extended or adjusted under 35 U.S.C. 154(b) by 137 days.

(21) Appl. No.: 15/485,998

(22) Filed: Apr. 12, 2017

(65) Prior Publication Data

US 2018/0120123 A1 May 3, 2018

(30) Foreign Application Priority Data

Nov. 1, 2016 (KR) .................. 10-2016-0144255

(51) Int. Cl.
*B60L 11/18* (2006.01)
*B60W 50/14* (2012.01)
(Continued)

(52) U.S. Cl.
CPC .......... *G01C 21/3661* (2013.01); *B60L 15/20* (2013.01); *B60L 58/12* (2019.02); *G01C 21/3423* (2013.01); *G01C 21/3469* (2013.01); *G01C 21/3492* (2013.01); *G01C 21/3605* (2013.01); *G01C 21/3685* (2013.01); *G01C 21/3691* (2013.01); *G05D 1/0088* (2013.01); *G05D 1/021* (2013.01); *B60L 2240/547* (2013.01); *B60L 2240/60* (2013.01);
(Continued)

(58) Field of Classification Search
CPC ............ G01C 21/3661; G01C 21/3423; G01C 21/3685; G01C 21/3605; G01C 21/3469; G01C 21/3492; G01C 21/3691; B60L 15/20; B60L 11/1861; B60L 2250/16; B60L 2240/60; B60L 2240/547; G05D 1/0088; G05D 1/021; H04W 88/02
See application file for complete search history.

(56) References Cited

U.S. PATENT DOCUMENTS

| 9,658,076 B2* | 5/2017 | Aich ................. G01C 21/3469 |
| 2015/0046081 A1* | 2/2015 | Brand ................. G01C 21/343 701/430 |
| 2017/0247036 A1* | 8/2017 | Halder ................ B60W 40/02 |

FOREIGN PATENT DOCUMENTS

| JP | 2010-093999 A | 4/2010 |
| JP | 2013-072717 A | 4/2013 |

(Continued)

OTHER PUBLICATIONS

Machine Translation of JP2013/072717 (Year: 2013).*

*Primary Examiner* — Alan D Hutchinson
(74) *Attorney, Agent, or Firm* — Morgan, Lewis & Bockius LLP

(57) ABSTRACT

A terminal device is provided to output information about using a transport device for a travel to a destination, a vehicle communicating with the terminal device, a personal mobility device communicating with the terminal device, a method of controlling the terminal device, and a method of controlling the vehicle.

17 Claims, 15 Drawing Sheets

(51) Int. Cl.
   *G01C 21/36*    (2006.01)
   *B60L 15/20*    (2006.01)
   *G01C 21/34*    (2006.01)
   *G05D 1/00*     (2006.01)
   *G05D 1/02*     (2006.01)
   *B60L 58/12*    (2019.01)
   *H04W 88/02*    (2009.01)
   *H04W 84/00*    (2009.01)

(52) U.S. Cl.
   CPC ........ *B60L 2250/16* (2013.01); *H04W 84/005* (2013.01); *H04W 88/02* (2013.01); *Y02T 10/7258* (2013.01)

(56) References Cited

FOREIGN PATENT DOCUMENTS

| | | |
|---|---|---|
| JP | 2014-228429 A | 12/2014 |
| KR | 10-2012-0066756 A | 6/2012 |
| KR | 10-2015-0029111 A | 3/2015 |
| KR | 10-2016-0107296 A | 9/2016 |

\* cited by examiner

TERMINAL DEVICE, VEHICLE, PERSONAL MOBILITY DEVICE, METHOD FOR CONTROLLING THE TERMINAL DEVICE AND METHOD FOR CONTROLLING THE VEHICLE

CROSS-REFERENCE TO RELATED APPLICATION(S)

The present application claims the benefit of Korean Patent Application No. 10-2016-0144255, filed on Nov. 1, 2016 in the Korean Intellectual Property Office, the disclosure of which is incorporated herein by reference.

BACKGROUND OF THE INVENTION

Field of the Invention

Embodiments of the present invention relate to a terminal device to provide information about a travel to a destination, a vehicle to communicate with the terminal device, a personal mobility device to communicate with the terminal device, a method of controlling the terminal device, and a method of controlling the vehicle.

Description of Related Art

Vehicles are mobile machines traveling on roads by driving wheels.

Vehicles include internal combustion engine vehicles (engine vehicles) generating mechanical power by combusting oil fuels such as gasoline and diesel and traveling by using the mechanical power and echo-friendly vehicles traveling by using electricity as driving power to increase fuel efficiency and reduce toxic gas emission Recently, development of vehicles for one person such as personal mobility devices has increased with environment regulations and increased metropolitan areas.

The personal mobility device is a middle/short distance small transport device developed by technological convergence between electrical charging and power and is also referred to as a smart mobility device and a micro mobility device.

That is, the personal mobility device is driven by electric power without emitting pollutants.

Also, the personal mobility device has been drawn attention as a transport device easy to carry and capable of relieving traffic congestion and parking difficulties.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a terminal device configured to output information about using a transport device for a travel to a destination, a vehicle communicating with the terminal device, a personal mobility device communicating with the terminal device, a method of controlling the terminal device, and a method of controlling the vehicle.

It is another aspect of the present invention to provide a terminal device configured to acquire personal mobility device use information based on battery charge level information of a personal mobility device and schedule information the user and output the acquired personal mobility device use information, a vehicle communicating with the terminal device, a method of controlling the terminal device, and a method of controlling the vehicle.

It is another aspect of the present invention to provide a vehicle configured to acquire personal mobility device use information and parking lot information based on battery charge level information of a personal mobility device and schedule information of the user, output the acquired information, and control autonomous driving and autonomous parking based on the parking lot information, and a method of controlling the vehicle.

Additional aspects of the disclosure will be set forth in part in the description which follows and, in part, will be obvious from the description, or may be learned by practice of the disclosure.

In accordance with one aspect of the present invention, a vehicle may include an input configured to receive an input of destination information; a communicator configured to communicate with a personal mobility device and a terminal device; a controller configured to receive battery charge level information of the personal mobility device, generate navigation information based on the destination information when a navigation function is performed, acquire personal mobility device use information based on the navigation information and the battery charge level information, control output of the acquired personal mobility device use information, and control the communicator to transmit the navigation information and a command to communicate with the personal mobility device to the terminal device when the personal mobility device is selected as a transport device via the input; and a display configured to output the personal mobility device use information.

The vehicle may further include a speed detector configured to detect a driving speed. The communicator communicates with a server. The controller receives traffic information from the server, predicts arrival time at a destination in case of traveling by the vehicle based on the received traffic information, the navigation information, and the detected driving speed, and controls output of the predicted arrival time.

The controller receives traveling speed information of the personal mobility device, predicts arrival time at the destination in case of traveling by the personal mobility device based on the received traveling speed information of the personal mobility device and the navigation information, and controls output of the predicted arrival time.

The input receives an input of an information output mode. If the information output mode is an automatic mode, the controller identifies schedule information of a user, determines availability of the personal mobility device based on scheduled time of the schedule information and the predicted arrival time, and controls output of the determined availability.

If the information output mode is the automatic mode, the controller acquires remaining distance information to the destination based on the navigation information, identifies available driving distance information of the personal mobility device corresponding to the battery charge level information, and determines availability of the personal mobility device based on the identified available driving distance information and the acquired remaining distance information to the destination.

The controller identifies available driving distance information of the personal mobility device corresponding to the battery charge level information, acquires parking lot information based on the available driving distance information of the personal mobility device and the navigation information, and controls output of the acquired parking lot information.

The input receives an input of an information output mode. If the information output mode is a manual mode, the controller acquires remaining distance information to the destination based on the navigation information, identifies available driving distance information of the personal mobility device corresponding to the battery charge level information, determines availability of the personal mobility device based on the identified available driving distance information and the acquired remaining distance information to the destination, controls output of the determined availability.

The controller identifies available driving distance information of the personal mobility device corresponding to the battery charge level information, identifies available driving distance information of the vehicle corresponding to fuel level information, acquires gas station information based on the navigation information, acquires parking lot information based on the available driving distance information of the vehicle, available driving distance information of the personal mobility device, the navigation information, and the gas station information, and controls output of the acquired parking lot information.

The vehicle may further include an autonomous driving controller to control autonomous driving and an autonomous parking controller to control autonomous parking. The controller acquires remaining distance information based on current position information and destination information, identifies available driving distance information of the personal mobility device corresponding to the battery charge level information, determines availability of the personal mobility device based on the available driving distance information and the remaining distance information, and controls output of information about the determined availability.

If the personal mobility device is selected as a transport device, the controller transmits an operation command to the autonomous driving controller and the autonomous parking controller.

In accordance with another aspect of the present invention, a terminal device may include an input configured to receive an input of destination information; a communicator configured to communicate with a personal mobility device and receive current position information; a controller configured to receive battery charge level information of the personal mobility device, generate navigation information based on the destination information when a navigation function is performed, acquire personal mobility device use information based on the navigation information and the battery charge level information, control output of the acquired personal mobility device use information, predict arrival time at a destination based on the navigation information, the current position information, and traveling speed information of the personal mobility device when the personal mobility device is selected as the transport device via the input, and controls output of the predicted arrival time; and a display configured to output the personal mobility device use information.

The terminal device may further include a speed detector configured to detect a driving speed of a vehicle. The communicator communicates with a server. The controller receives traffic information from the server, predicts arrival time at a destination in case of traveling by the vehicle based on the received traffic information, the navigation information, and the detected driving speed of the vehicle, and controls output of the predicted arrival time.

The input receives an input of an information output mode. If the information output mode is an automatic mode, the controller identifies available driving distance information of the personal mobility device corresponding to the battery charge level information, determines availability of the personal mobility device based on remaining distance information to the destination, the identified available driving distance information, scheduled time of schedule information of a user, and the predicted arrival time, and controls output of the determined availability.

The input receives an input of an information output mode. If the information output mode is a manual mode, the controller identifies available driving distance information of the personal mobility device corresponding to the battery charge level information, determines availability of the personal mobility device based on the identified available driving distance information and remaining distance information to the destination, and controls output of information about the determined availability.

The controller identifies available driving distance information of the personal mobility device corresponding to the battery charge level information, acquires parking lot information based on the available driving distance information of the personal mobility device and the navigation information, and controls output of the acquired parking lot information.

In accordance with still another aspect of the present invention, a personal mobility device may include a battery configured to supply driving power to a motor; a battery charge level detector configured to detect a battery charge level; a communicator configured to communicate with at least one device of a vehicle and a terminal device; and a controller configured to control pairing with the at least one device and control the communicator to transmit battery charge level information to the at least one device.

The personal mobility device further include a storage configured to store available driving distance information and available driving time information corresponding to the battery charge level information and store traveling speed information. The controller controls transmission of information stored in the storage.

The personal mobility device further includes a speed detector configured to detect a traveling speed; and an input configured to receive an input of a target speed. The controller controls driving of the motor based on the detected traveling speed and the target speed.

In accordance with still another aspect of the present invention, a method of controlling a vehicle, the method may include generating navigation information based on destination information upon receiving an input of the destination information; communicating with a personal mobility device upon receiving an input of an information output mode; receiving battery charge level information of the personal mobility device; identifying available driving distance information of the personal mobility device corresponding to the received battery charge level information; outputting personal mobility device use information acquired based on the navigation information and available driving distance information of the personal mobility device; communicating with a terminal device when the personal mobility device is selected as a transport device via an input; and transmitting the navigation information and a command to communicate with the personal mobility device to the terminal device.

The method may further include identifying traveling speed information of the personal mobility device; predicting arrival time at a destination in case of traveling by the personal mobility device based on the navigation information and the traveling speed information of the personal mobility device; and controlling output of the predicted arrival time.

The method may further include identifying schedule information of a user if the information output mode is an automatic mode; determining availability of the personal mobility device based on scheduled time of schedule information and the predicted arrival time; and outputting information about the determined availability.

In accordance with still another aspect of the present invention, a method of controlling a terminal device, the method may include generating navigation information based on destination information upon receiving an input of the destination information; communicating with a personal mobility device upon receiving an input of an information output mode; receiving battery charge level information of the personal mobility device; identifying available driving distance information of the personal mobility device corresponding to the received battery charge level information; outputting personal mobility device use information acquired based on the navigation information and available driving distance information of the personal mobility device; periodically receiving battery charge level information when the personal mobility device is selected as a transport device via an input; adjusting the available driving distance based on the received battery charge level information; and outputting information about the adjusted available driving distance. The personal mobility device use information comprises arrival time at a destination predicted based on the navigation information, current position information, and traveling speed information of the personal mobility device.

The traveling speed information of the personal mobility device comprises information about a speed detected by a speed detector provided in the terminal device.

The method may further include: identifying schedule information of a user if the information output mode is an automatic mode; determining availability of the personal mobility device based on scheduled time of schedule information and the predicted arrival time; and outputting information about the determined availability.

The method may further include: acquiring parking lot information based on the available driving distance information of the personal mobility device and the navigation information; and controlling output of the acquired parking lot information.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
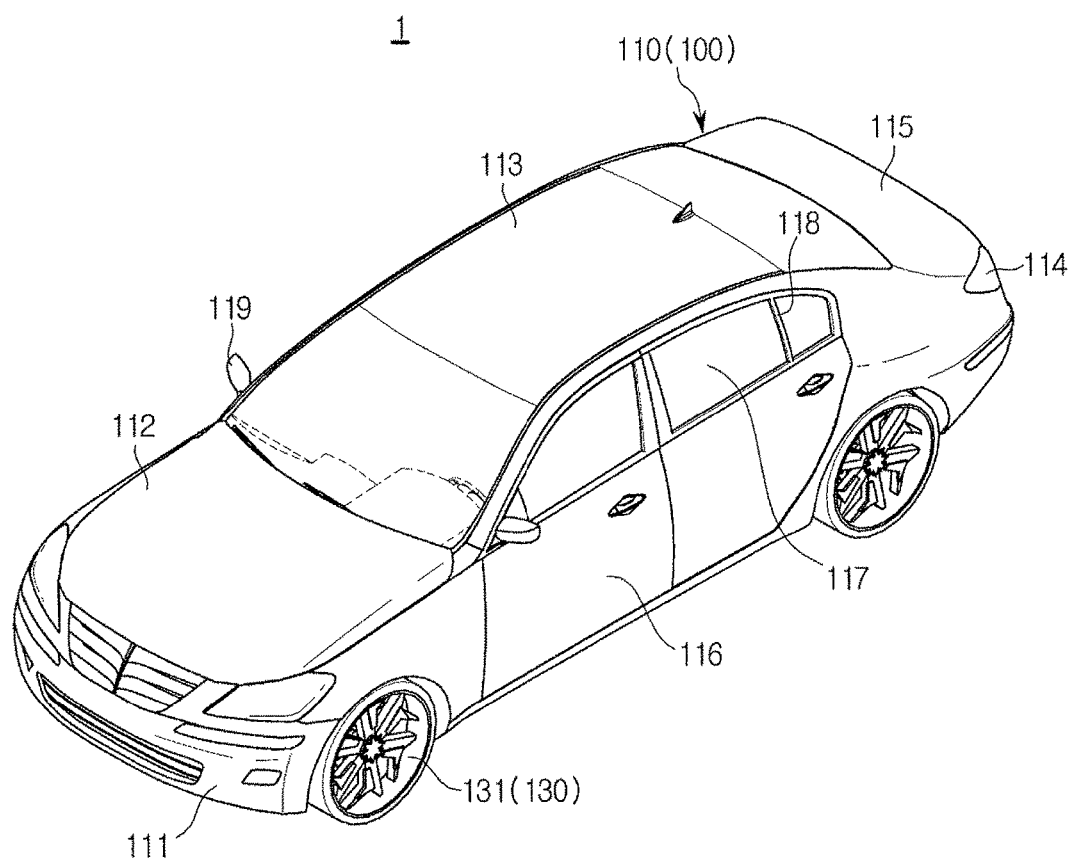
FIG. 1 is an external view of a vehicle according to an embodiment.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
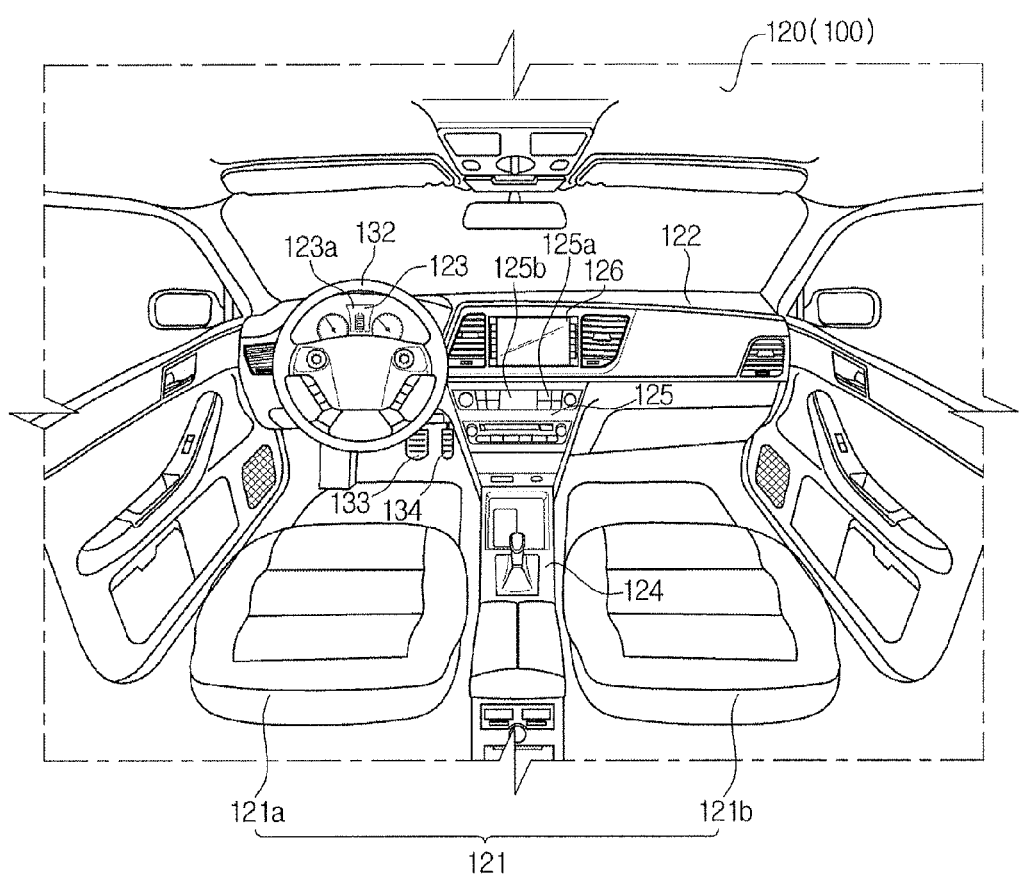
FIG. 2 is an internal view of the vehicle according to an embodiment.

FIG. 1 is an external view of a vehicle according to an embodiment. FIG. 2 is an internal view of the vehicle.

A vehicle 1 includes a body 100 having an external 110 and an internal 120 and a chassis 130 in which mechanical devices required to drive the vehicle 1 are disposed.

As illustrated in FIG. 1, the external 110 of the body 100 includes a front panel 111, a hood 112, a roof panel 113, a rear panel 114, a trunk 115, front and rear doors 116 located left and right sides of the vehicle 1, and window glasses 117 provided to be opened or closed at the doors 116.

The trunk 115 has a space to accommodate articles including a personal mobility device 2.

The trunk 115 may also include a charger terminal to charge the personal mobility device 2.

The external 110 of the body further includes a filler 118 disposed at boundaries between the front panel 11, the hood 112, the roof panel 113, the rear panel 114, the trunk 115, the front and rear doors 116 located left and right sides of the vehicle 1 and the window glasses 117, and side mirrors 119 to provide a driver with views behind the vehicle 1.

As illustrated in FIG. 2, the internal 120 of the body 100 includes seats 121 on which passengers sit, a dashboard 122, an instrument cluster 123 disposed on the dashboard 122 and provided with a tacometer, a speedometer, a coolant thermometer, a fuel gauge, an indicator light for direction change, a high beam indicator light, a warning light, a seat belt warning light, a trip meter, an odometer, an automatic transmission selection indicator light, a door open warning light, an engine oil warning light, and a low fuel warning light, a center fascia 124 in which vents and a control panel of an air conditioner and an audio device are disposed, a head device 125 disposed at the center fascia 124 and controlling the audio device, the air conditioner, and a heater, and a user interface 126 to receive an operation command from a user and output operation information.

The seats 121 refer to chairs that allow passengers to sit safely and comfortably in the internal space of the vehicle. The seats 121 may be classified into a driver's seat 121*a*, a passenger's seat 121*b*, and back seats.

The instrument cluster 123 includes a display 123*a*, and the display 123*a* may display information about a communication connection with the personal mobility device 2, information about a battery charge level of the personal mobility device 2, and the like.

The head device 125 may include an input 125*a* to receive an input of a command to operate at least one function and a display 125*b* to display information about operation of various functions and information input by a user.

The user interface 126 may include a terminal device for vehicles disposed in the vehicle.

The user interface 126 may be implemented using a touch screen in which a touch panel and a display panel are integrated.

Also, the user interface 126 may include a display panel provided at the dashboard 122 and displaying an image and a control system disposed around a gear-shifting lever and receiving an operation command.

The chassis 130 of the vehicle which is a frame supporting the body 100 may include a plurality of wheels 131, a steering wheel 132 of a steering apparatus connected into the vehicle, a brake pedal 133 pressed by the user in accordance with braking intention of the user, and an accelerator pedal 134 pressed by the user in accordance with acceleration intention of the user (refer to FIG. 1 and FIG. 2).

The chassis 130 of the vehicle includes driving apparatuses including a power generation apparatus, a power transmission apparatus, a steering apparatus, a brake apparatus, a suspension apparatus, and a transmission apparatus to apply driving power and braking power to the wheels disposed at front and rear portions of both sides.

The power generation apparatus may include at least one of a battery, a motor, an engine, a fuel device, a cooling apparatus, and a fuel supply apparatus. The configuration of the power generation apparatus may be determined in accordance with a power source of the vehicle.

The vehicle 1 may further include a battery electrically connected to electronic devices disposed in the vehicle 1 to supply driving power thereto.

Figure 3:
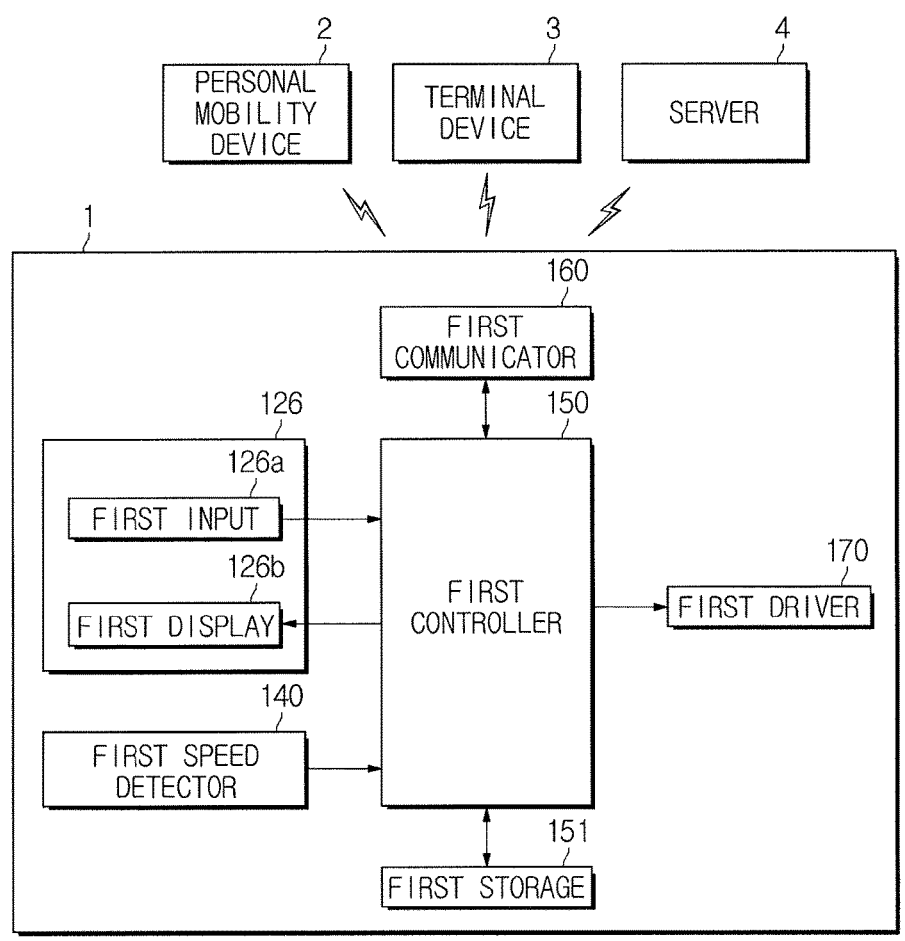
FIG. 3 is a control block diagram of the vehicle according to an embodiment.
Figure 4:
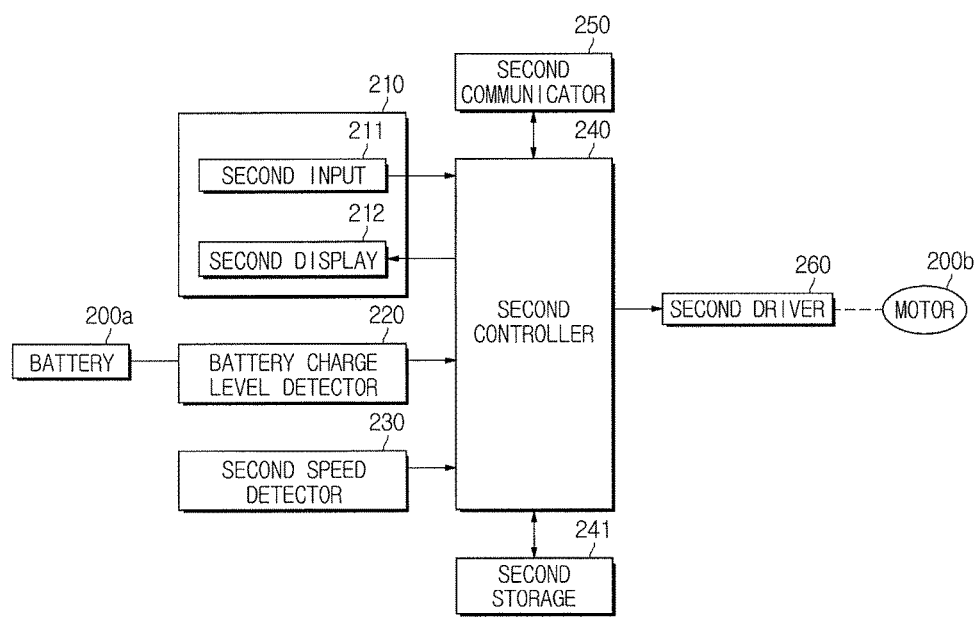
FIG. 4 is a control block diagram of a personal mobility device communicating with the vehicle according to an embodiment.
Figure 5:
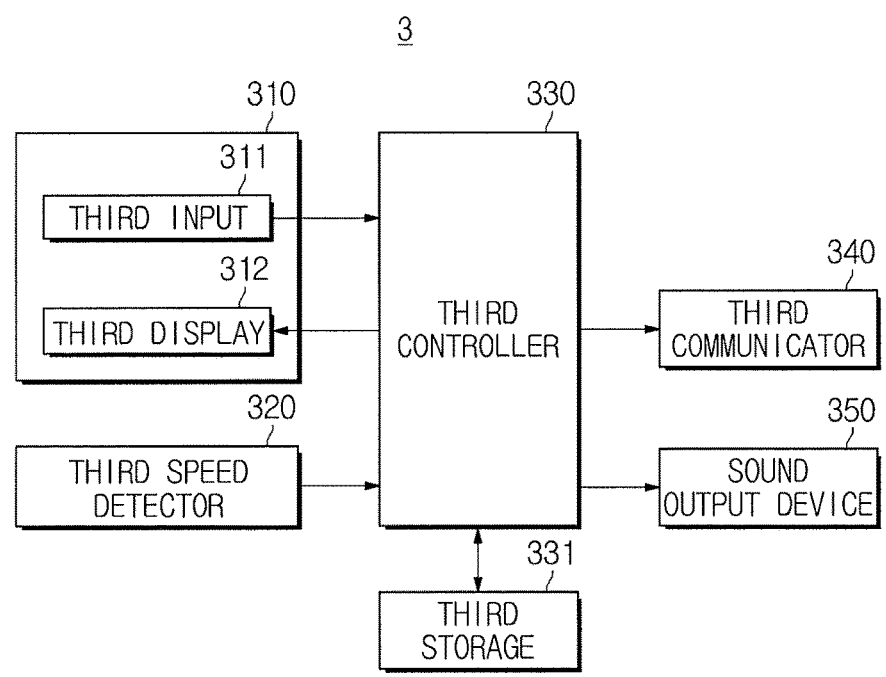
FIG. 5 is a control block diagram of a terminal device communicating with the vehicle according to an embodiment.

FIG. 3 is a control block diagram of the vehicle 1 according to an embodiment. FIG. 4 is a control block diagram of a personal mobility device 2 communicating with the vehicle 1. FIG. 5 is a control block diagram of a terminal device 3 communicating with the vehicle 1.

In the present embodiment, the term 'first' is used to define elements of the vehicle 1, the term 'second' is used to define elements of the personal mobility device 2, and the term 'third' is used to define elements of the terminal device 3, to distinguish the elements of the vehicle 1, the elements of the personal mobility device 2, and the elements of the terminal device 3 from one another.

As illustrated in FIG. 3, the vehicle 1 includes a first user interface 126, a first speed detector 140, a first controller 150, a first storage 151, a first communicator 160, and a first driver 170.

The first user interface 126 receives an input of an operation command from a user and outputs operation information.

The first user interface 126 may perform one or more functions selected from navigation function, audio function, video function, radio function, web search function, broadcasting function (i.e., DMB function), and the Internet function.

The first user interface 126 includes a first input 126*a* to receive the operation command and a first display 126*b* to output the operation information.

The first input 126*a* may be a touch panel to receive a touch signal or a control system to select an operation command.

The first input 126*a* may receive destination information while performing the navigation function.

The first input 126*a* may receive an input of an information output mode, information about a transport device selected by the user, and information about a parking lot selected by the user.

In this regard, the transport device includes vehicles and personal mobility devices, and the information output mode includes a manual mode in which personal mobility device use information is acquired based on a select command of the user and an automatic mode in which personal mobility device use information is automatically acquired based on information about a schedule of the user.

The first input 126*a* receives a pairing command to be paired with the personal mobility device 2 and the terminal device 3.

The first input 126*a* may also receive an input of information about the schedule of the user.

The first display 126*b* may include a flat panel display to display the operation information as an image.

The first display 126*b* may display at least one of map information, route information, current position information, driving speed information of the vehicle 1, destination information, and traffic information as an image while performing the navigation function.

The first display 126*b* may display information about absence of the personal mobility device 2, notification about low battery of the personal mobility device, information about communication connection with the personal mobility device 2, and information about connection state with the terminal device 3.

The first display 126*b* may display the information output mode and may also display personal mobility device use information and vehicle use information.

In this regard, the personal mobility device use information may include information about at least one of available driving distance and available driving time corresponding to a remaining battery charge level in a case of traveling by the personal mobility device and may further include information about arrival time at a destination.

The vehicle use information may further include information about arrival time at the destination while traveling by the vehicle 1.

The vehicle use information may include information about at least one of available driving distance and available driving time corresponding to information about a remaining fuel level in a case of traveling by the vehicle 1.

The first speed detector 140 detects a driving speed of the vehicle 1.

The first speed detector 140 includes a plurality of wheel speed sensors disposed at the plurality of wheels, respectively, and detecting speeds of the respective wheels.

The first speed detector 140 may further include an acceleration sensor to detect acceleration of the vehicle 1.

The first controller 150 receives traffic information from the server 4, receives schedule information of the user from the terminal device 3, and receives detected battery charge level information from the personal mobility device 2.

The first controller 150 may receive a battery use table from the personal mobility device 2 and store the received battery use table.

In this regard, the battery use table includes a list in which available driving distances and available driving times are matched to battery charge levels.

When the navigation function is selected and destination information is input, the first controller 150 generates route information based on current position information and destination information, matches the generated route information to map information, and controls output of the matched map information and route information.

While generating the route information, the first controller 150 may generate and output a plurality of pieces of route information and store one piece of route information selected by the user among a plurality of pieces of route information.

The first controller 150 may generate optimal route information by using traffic information while generating the route information.

The first controller 150 acquires driving speed of the vehicle 1 based on a plurality of wheel speeds.

Furthermore, the first controller 150 may also acquire the driving speed of the vehicle 1 based on the detected acceleration.

The first controller 150 may predict arrival time at the destination based on navigation information, traffic information, and driving speed information and control output of the predicted arrival time.

Here, the navigation information may include current position information, destination information, route information, intersection information, and the like.

When the navigation function is selected, the first controller 150 identifies presence of a pre-registered personal mobility device. When the pre-registered personal mobility device is absent, the first controller 150 controls output of information notifying the absence of the personal mobility device.

The first controller 150 may identify the presence of the pre-registered personal mobility device by checking the presence of a communicable personal mobility device therein.

The first controller 150 may also identify the presence of the pre-registered personal mobility device by checking whether or not the personal mobility device is connected to a charger terminal in the vehicle 1.

Upon receiving the detected battery charge level, the first controller 150 compares the detected battery charge level with a reference battery charge level and controls output of notification about low battery of the personal mobility device 2 when the detected battery charge level is less than the reference battery charge level.

When the information output mode is the manual mode, the first controller 150 acquires vehicle use information and personal mobility device use information, respectively, based on navigation information, traffic information, battery charge level information, and driving speed information and controls output of the acquired vehicle use information and personal mobility device use information.

When the information output mode is the automatic mode, the first controller 150 acquires vehicle use information and personal mobility device use information, respectively, based on schedule information, navigation information, traffic information, driving speed information, and battery charge level information and controls output of the acquired vehicle use information and personal mobility device use information.

In the manual information output mode, the first controller 150 may determine availability of the personal mobility device 2 by acquiring an available driving distance based on detected battery charge level, acquiring a remaining distance based on current position information (or parking lot position information) and destination information, and determining the possibility of a round trip between the current position and the destination based on the acquired information about available driving distance and remaining distance.

In the automatic information output mode, the first controller 150 may determine availability of the personal mobility device 2 by determining the possibility of a round trip between the current position and the destination and the possibility of arrival at the destination within scheduled time of the schedule information.

In the automatic information output mode, the first controller 150 may acquire position information about round trip available parking lots by the personal mobility device 2 based on navigation information and detected battery charge level, select a parking lot enabling arrival at the destination within scheduled time based on speed information of the personal mobility device 2 among the acquired position information about parking lots, and control output of position information of the selected parking lot.

In this case, the round trip refers to a round trip between the parking lot and the destination.

Speed information of the personal mobility device 2 may include at least one selected from an average speed, a maximum speed, and a minimum speed of the personal mobility device 2.

When personal mobility device use information is acquired, the first controller 150 may acquire information about at least one of available driving distance and available driving time based on the battery use table and detected battery charge level and acquire information indicating that the personal mobility device 2 is available or unavailable based on the acquired information.

In this regard, the vehicle use information refers to distance and time information in case of traveling from the current position to the destination by the vehicle 1 as a transport device and includes information about a remaining distance from the current position to the destination, a remaining time from the current position to the destination, and arrival time at the destination.

The personal mobility device use information refers to distance and time information in case of traveling from the current position to the destination by the personal mobility device 2 as a transport device and includes information about a remaining distance from the current position to the destination, a remaining time from the current position to the destination, and arrival time at the destination.

In this case, the current position may include a parking available position, and the parking available position may include a position of a parking lot.

The personal mobility device use information may further include information about a start position and a start time of using the personal mobility device 2 in a case of using the personal mobility device 2.

The first controller 150 may search for a parking lot based on navigation information and traffic information and control output of information about the searched parking lot.

In this regard, the information about the parking lot may include information about position of the parking lot, parking fee of the parking lot, a travel time to the parking lot, a distance to the parking lot, and parking space of the parking lot.

The first controller 150 may identify a fuel level of the vehicle 1, identify information about an available driving distance of the vehicle 1 corresponding to the identified fuel level, and control output of the information about the available driving distance of the vehicle 1.

In this regard, the fuel level of the vehicle 1 may be detected by a fuel level detector.

The first controller 150 may also automatically select at least one parking lot among a plurality of parking lots based on the fuel level of the vehicle 1, parking lot position information, and gas station position information and output information about the selected parking lot.

When the personal mobility device 2 is selected as the transport device, the first controller 150 transmits at least one of navigation information, battery charge level information of the personal mobility device 2, and schedule information of the user to the terminal device 3.

The navigation information transmitted to the terminal device 3 may include current position information, route information, destination information, and the like.

When the personal mobility device 2 is selected as the transport device, the first controller 150 may re-generate route information based on current position information and destination information. This is because the first controller 150 considers that the personal mobility device 2 may travel on the sidewalk. The first controller 150 may search for an optimal route and provide information about the searched route to the user.

When the personal mobility device 2 has a navigation function and the user selects the personal mobility device 2 as the transport device, the first controller 150 may also transmit navigation information and battery charge level information to the personal mobility device 2.

The first controller 150 may output traveling availability information to the destination by the personal mobility device 2 while periodically identifying the battery charge level of the personal mobility device 2 while the vehicle is running.

The first controller 150 may also output one-way trip availability information and round trip availability information by the personal mobility device 2 based on the battery charge level of the personal mobility device 2 and the remaining distance from the current position to the destination.

The first storage 151 stores the battery use table of the personal mobility device 2 and maximum speed information of the personal mobility device 2.

The first storage 151 may store the reference battery charge level for notification about low battery of the personal mobility device.

The first storage 151 stores identification information of the pre-registered personal mobility device and identification information of a pre-registered terminal device.

The first storage 151 may also store information about the schedule of the user.

Here, the information about the schedule of the user may include at least one of schedule information input to the first input and schedule information received from the terminal device.

The first controller 150 may be implemented using a memory configured to store data for algorithms to control operation of elements of the vehicle 1 or programs constructed from algorithms, and a processor configured to execute the operation by using data stored in the memory. In this case, the memory and the processor may be implemented using separate chips or integrated into a single chip.

The first storage 151 may be implemented using a non-volatile memory device including cache memory, Read Only Memory (ROM), Programmable ROM (PROM), Erasable Programmable ROM (EPROM), Electrically Erasable Programmable ROM (EEPROM), and flash memory, a volatile memory device including Random Access Memory (RAM), or a storage medium including Hard Disk Drive (HDD) and CD-ROM, without being limited thereto.

The first storage 151 may be a memory implemented as a separate chip from the processor described above regarding the first controller 150 or a single chip integrated with the processor.

The first communicator 160 communicates with the personal mobility device 2, the terminal device 3, and the server 4.

The first communicator 160 may perform communication in a wired or wireless manner.

The first communicator 160 may further include a GPS receiver to acquire a current position of the vehicle 1.

The first driver 170 drives various driving devices related to driving and braking of the vehicle 1 in accordance with driver's intention of driving and braking the vehicle 1 while traveling by the vehicle 1 and stops driving of the various driving devices when the vehicle 1 is not in use.

The personal mobility device 2 communicates with the vehicle 1, detects the battery charge level, and transmits information about the detected battery charge level and the battery use table to the vehicle 1 and the terminal device 3.

The terminal device 3 communicates with the vehicle 1, receives at least one of navigation information, information about the personal mobility device 2, and schedule information from the vehicle 1, guides a route based on the received navigation information, outputs information about the battery charge level of the personal mobility device 2, and outputs information about an available driving distance corresponding to the battery charge level of the personal mobility device 2.

The terminal device 3 may also communicate with the personal mobility device 2. In this case, the terminal device 3 may periodically receive information about battery charge levels of the personal mobility device 2 and output the battery charge levels information and available driving distances of the personal mobility device 2.

The terminal device 3 may include mobile communication and portable devices including smartphones, tablets, PDAs, and wearable devices.

The server 4 may transmit traffic information to the vehicle 1 or the terminal device 3.

The personal mobility device 2 and the terminal device 3 will be described in more detail.

As illustrated in FIG. 4, the personal mobility device 2 includes a battery 200*a* configured to supply driving power and be rechargeable, a motor 200*b* configured to transmit a driving force to at least one wheel by rotating upon receiving power from the battery 200*a*, a second user interface 210, a battery charge level detector 220, a second speed detector 230, a second controller 240, a second storage 241, a second communicator 250, and a second driver 260.

The battery 200*a* may be charged wirelessly or via a cable connected to a plug or a socket.

The second user interface 210 receives an input of an operation command of a user and outputs operation information of the personal mobility device 2.

The second user interface 210 may include a second input 211 and a second display 212.

The second input 211 receives a power On/Off command and a pair command with the vehicle 1 and the terminal device 3.

The second input 211 may also receive an input of a target speed of the personal mobility device 2.

The second display 212 displays operation On/Off state information of the personal mobility device 2.

The second display 212 may display information about a battery charge level, an available driving distance, and an available driving time in a case of traveling by the personal mobility device 2.

The second display 212 may also display a fully charged state and a discharged state of the battery 200*a*.

The second display 212 may be implemented using a flat panel display or a light-emitting diode.

The battery charge level detector 220 detects a battery charge level of the battery 200*a*.

The battery charge level detector 220 may include at least one of a current detector to detect current of the battery 200*a* and a voltage detector to detect voltage of the battery 200*a*.

Here, the voltage detector may detect a voltage of an output terminal of the battery 200*a*.

The second speed detector 230 detects a traveling speed of the personal mobility device 2.

The second speed detector 230 may include a speed sensor to detect a rotation speed of the motor 200*b* of the personal mobility device 2 and an acceleration sensor to detect acceleration of the personal mobility device 2.

Upon receiving the operation command via the second input 211, the second controller 240 controls rotation of the motor 200*b*.

The second controller 240 may control power supplied to the motor 200*b* by comparing the traveling speed of the personal mobility device 2 with the target speed.

The second controller 240 controls pairing with the vehicle 1 and the terminal device 3 and communicates with the vehicle 1 and the terminal device 3 upon completion of the pairing.

The second controller 240 acquires the battery charge level information based on information detected by the battery charge level detector 220 and controls the second communicator 250 to transmit the acquired battery charge level information to at least one of the vehicle 1 and the terminal device 3.

Here, the information detected by the battery charge level detector 220 includes information about at least one of current and voltage of the battery 200*a*.

Configuration of the second controller 340 acquiring the battery charge level will be exemplarily described.

For example, the second controller 240 may identify a detected voltage of the battery 200*a* and acquire a battery charge level based on the identified voltage of the battery 200*a*.

As another example, the second controller 240 may identify a detected input current and a detected output current of the battery 200*a* and acquire a battery charge level by integrating the input current and the output current with respect to time.

As another example, the second controller 240 may also acquire the battery charge level based on the detected current of the battery 200*a* and the detected voltage of the battery 200*a*.

As another example, the second controller 240 may acquire the battery charge level based on a detected current when the battery charge level is a first battery charge level or greater and acquire the battery charge level based on a detected voltage when the battery charge level is a second battery charge level or less.

The first battery charge level is less, by a predetermined amount, than a first reference battery charge level, which is a battery charge level of the fully charged state, and the second battery charge level is greater, by a predetermined amount, than a second reference battery charge level, which is a battery charge level of the discharged state.

The second controller 240 controls displaying of the identified battery charge level.

The second controller 240 outputs information about the fully charged state when the identified battery charge level is the first reference battery charge level or greater and outputs information about the discharge state when the identified battery charge level is the second reference battery charge level or less.

The second controller 240 may control the second communicator 250 to transmit the battery use table to at least one of the vehicle 1 and the terminal device 3.

The second storage 241 stores the first reference battery charge level corresponding to the fully charged state of the battery 200*a* and the second reference battery charge level corresponding to the discharge state thereof.

The second storage 241 stores the battery use table corresponding to specifications of the battery 200*a*.

The battery use table may be stored as a list in which the battery charge levels are matched to respective available driving distances and available driving times of the personal mobility device 2.

The second storage 241 may store identification information of the paired vehicle 1 and terminal device 3.

The second controller 240 may be implemented using a memory configured to store data for algorithms to control operation of elements of the vehicle 1 or programs constructed from algorithms, and a processor configured to execute the operation by using data stored in the memory. In this case, the memory and the processor may be implemented using separate chips or integrated into a single chip.

The second storage 241 may be implemented using a non-volatile memory device including cache memory, Read Only Memory (ROM), Programmable ROM (PROM), Erasable Programmable ROM (EPROM), Electrically Erasable Programmable ROM (EEPROM), and flash memory, a volatile memory device including Random Access Memory (RAM), or a storage medium including Hard Disk Drive (HDD) and CD-ROM, without being limited thereto.

The second storage 241 may be a memory implemented as a separate chip from the processor described above regarding the second controller 240 or a single chip integrated with the processor.

The second communicator 250 communicates with the vehicle 1 and the terminal device 3.

The second communicator 250 may perform communication in a wired or wireless manner.

The second driver 260 rotates the motor 200b based on a command of the second controller 240.

The personal mobility device 2 may further perform a navigation function. In the instant case, the personal mobility device 2 may receive navigation information from the vehicle 1 and guide a route to the destination based on the navigation information.

The personal mobility device 2 may further receive schedule information from the vehicle 1 and guide a route to the destination in accordance with a schedule of the user based on the schedule information.

As illustrated in FIG. 5, the terminal device 3 includes a third user interface 310, a third speed detector 320, a third controller 330, a third storage 331, a third communicator 340, and a sound output device 350.

The third user interface 310 may receive an input of an operation command of a user and outputs operation information of the terminal device 3.

The third user interface 310 may include a third input 311 and a third display 312.

The third input 311 may receive an input of a command to operate the navigation function.

The third input 311 may receive information about the schedule of the user and receive a pairing command to be paired with the personal mobility device 2 and the vehicle 1.

The third display 312 displays navigation information while performing the navigation function.

The third display 312 may display a remaining distance to the destination, a remaining time to the destination, arrival time at the destination, and the like, and may further display information about the schedule of the user.

The third display 312 may also display battery charge level information of the personal mobility device and information about the available driving distance and the available driving time in a case of traveling by the personal mobility device.

The third display 312 displays one-way trip availability information and round trip availability information in a case of traveling by the personal mobility device 2 and displays a request for charging the personal mobility device 2 when the one-way trip is available by the personal mobility device 2.

The third speed detector 320 detects a traveling speed of the terminal device 3.

The third speed detector 320 may include an acceleration sensor to detect acceleration of the terminal device 3.

The third speed detector 320 may indirectly detect the traveling speed of the personal mobility device 2.

Upon receiving a command to communicate with the personal mobility device 2 from the vehicle 1 while communicating with the vehicle 1, the third controller 330 controls communication with the personal mobility device 2.

Upon receiving the navigation information from the vehicle 1, the third controller 330 performs the navigation function and controls output of information about guiding a route to the destination based on the received navigation information.

The third controller 330 may further receive the battery charge level of the personal mobility device 2 and schedule information from the vehicle 1.

The third controller 330 may predict the traveling speed of the personal mobility device 2 based on changes in current position with respect to time.

The third controller 330 may directly receive information about the battery charge level and the traveling speed of the personal mobility device 2 from the personal mobility device 2 periodically.

The third controller 330 predicts arrival time at the destination based on the traveling speed of the personal mobility device 2 and the navigation information and controls output of the predicted arrival time.

The third controller 330 may periodically acquire information about a remaining distance and a remaining time to the destination based on the navigation information and current position information and control output of information about the periodically acquired remaining distance and remaining time.

Upon receiving the navigation information, the third controller 330 may re-search for a route for a travel by the personal mobility device 2 and control output of information about the re-searched route.

When the personal mobility device 2 is used in case a one-way trip is possible, the third controller 330 determines whether the current position is the destination. When the current position is the destination, the third controller 330 may output a request for charging the personal mobility device 2.

The third storage 331 may store applications to perform the navigation function.

The third storage 331 stores identification information of the paired vehicle 1 and personal mobility device 2.

The third storage 331 may store information about the schedule of the user.

The third storage 331 may store the battery use table of the personal mobility device 2.

The third storage 331 may store current position information of the vehicle 1, i.e., parking lot position information.

The third communicator 340 communicates with the personal mobility device 2, the vehicle 1, and the server 4.

The third communicator 340 may include a wired or wireless communication device.

The third communicator 340 may further include a GPS receiver to acquire a current position of the terminal device 3.

The sound output device 350 outputs operation information of the terminal device 3 as a sound.

The sound output device 350 may output navigation information as a sound while performing the navigation function as a sound.

The sound output device 350 may also output the request for charging the personal mobility device as a sound.

Figure 6:
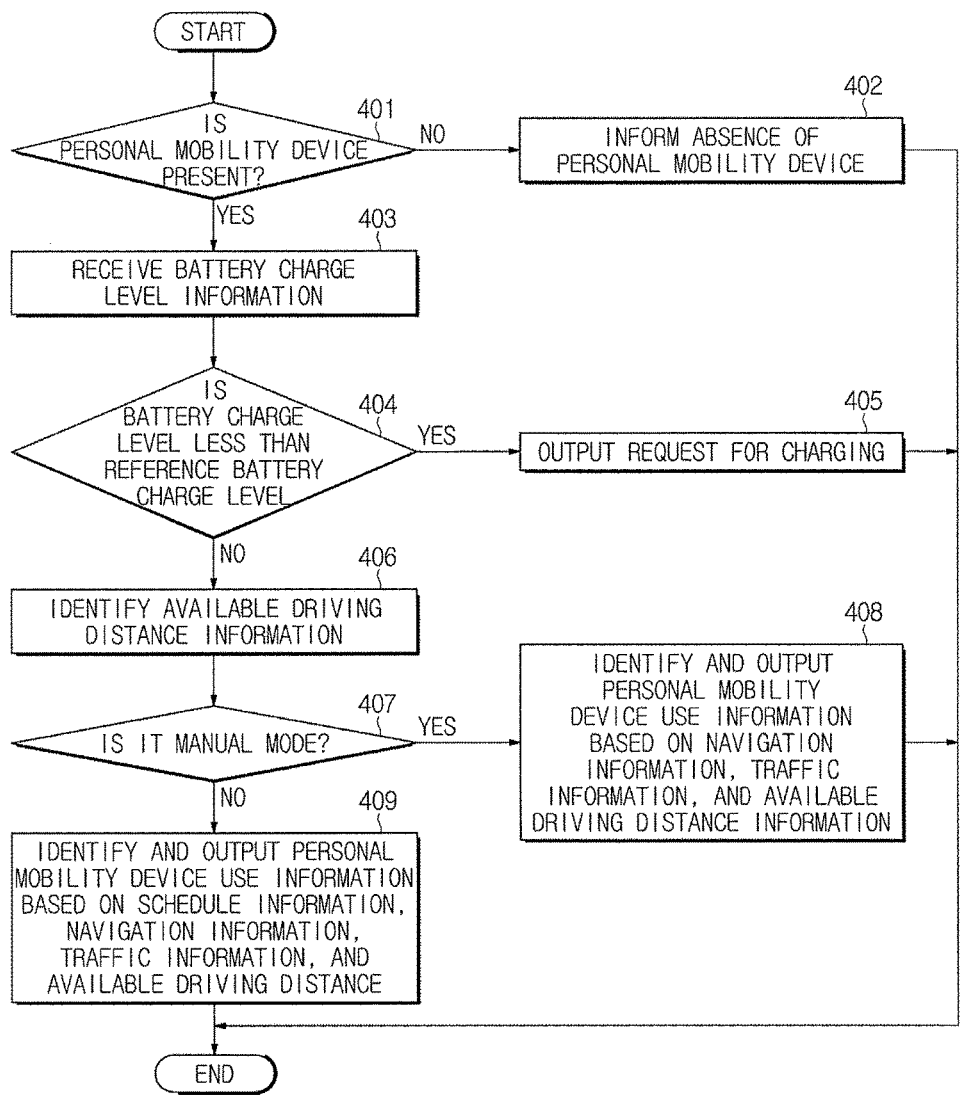
FIG. 6 is a flowchart of controlling the vehicle according to an embodiment.

FIG. 6 is a flowchart of controlling the vehicle 1 according to an embodiment.

When the ignition of the vehicle 1 is turned on and the navigation function is selected by the user, the vehicle 1 acquires a current position based on position information received by the GPS receiver of the first communicator 160, reads map information stored in the first storage 151 based on the acquired current position, and displays the read map information on the first user interface 126.

When destination information is input via the first user interface 126, the vehicle 1 searches for a route based on the input destination information and current position information, generates navigation information by matching information about the searched route to map information, and displays the generated navigation information on the first user interface 126.

While searching for the route, the vehicle 1 may receive traffic information from the server 4 and search for the route by using the received traffic information.

Also, the vehicle 1 may search for a plurality of routes and output the searched routes and the user may select one of the plurality of routes. In the instant case, the vehicle 1 may generate navigation information by matching information about the route selected by the user to the map information.

The vehicle 1 may acquire information about a remaining distance and a remaining time to the destination based on route information, destination information, navigation information of the current position, driving speed information of the vehicle 1, and traffic information, display the acquired remaining distance information and remaining time information, and predict and display arrival time at the destination.

Also, the vehicle 1 may identify whether a pre-registered personal mobility device is present in the vehicle 1 (401). When the pre-registered personal mobility device is absent, the vehicle 1 informs the user of the absence of the personal mobility device 2 (402).

Here, the presence of the pre-registered personal mobility device in the vehicle 1 may be identified by attempting communication with the pre-registered personal mobility device and checking the presence of a communicable personal mobility device therein.

The presence of the pre-registered personal mobility device 2 in the vehicle 1 may also be identified by checking whether or not the personal mobility device 2 is connected to a charger terminal in the vehicle 1.

The vehicle 1 may inform the user of the absence of the personal mobility device 2 by displaying information about the absence of the personal mobility device 2 as an image via the first user interface 126 of the vehicle 1 or as a sound via a speaker of the vehicle 1.

When the pre-registered personal mobility device is present in the vehicle 1, the vehicle 1 receives battery charge level information from the personal mobility device 2 (403), compares a detected battery charge level corresponding to the received battery charge level information with a reference battery charge level, and outputs a request for charging the battery of the personal mobility device 2 (405) when the detected battery charge level is less than the reference battery charge level (404).

In this regard, the request for charging the battery of the personal mobility device 2 may be output by displaying the request for charging the battery of the personal mobility device 2 as an image via the first user interface 126 of the vehicle 1 or as a sound via a speaker of the vehicle 1.

When the detected battery charge level is greater than the reference battery charge level, the vehicle 1 identifies available driving distance corresponding to the detected battery charge level (406).

When the personal mobility device 2 is in a charging mode, the vehicle 1 may also identify information about available driving distance corresponding to a battery charge level on completion of charging.

The vehicle 1 identifies the information output mode. When the information output mode is a manual mode (407), the vehicle 1 identifies use information and personal mobility device use information respectively based on navigation information, traffic information, and the identified available driving distance information and outputs the identified vehicle use information and personal mobility device use information (408).

In this case, the vehicle 1 outputs a remaining distance to the destination, a remaining time to the destination, arrival time at the destination, and the like in a case of traveling from the position of the vehicle 1 to the destination by the vehicle 1 as the vehicle use information, and the remaining distance to the destination, the remaining time to the destination, arrival time at the destination, and the like in a case of traveling from the position of the vehicle 1 to the destination by the personal mobility device 2 as the personal mobility device use information.

Here, the position of the vehicle 1 includes a current position of the vehicle 1 and a position of a parking lot.

The position of the parking lot may include a plurality of positions of parking lots located between the current position of the vehicle 1 and the destination.

Accordingly, the vehicle 1 may output vehicle use information and personal mobility device use information respectively corresponding to the plurality of positions of the parking lots.

The vehicle 1 may further output destination arrival possibility information about the possibility of arriving at the destination by the battery charge level of the personal mobility device 2 as the personal mobility device use information.

Also, the vehicle 1 may further output one-way trip availability information and round trip availability information corresponding to the battery charge level of the personal mobility device 2 as the personal mobility device use information.

When the information output mode is the automatic mode, the vehicle 1 may identify vehicle use information and personal mobility device use information respectively based on schedule information of the user, navigation information, traffic information, and the identified available driving distance information, and output the identified vehicle use information and personal mobility device use information, respectively (409).

In this case, the vehicle 1 outputs a remaining distance to the destination, a remaining time to the destination, arrival time at the destination, and the like in a case of traveling from the position of the vehicle 1 to the destination by the vehicle 1 as the vehicle use information, and a remaining distance to the destination, a remaining time to the destination, arrival time at the destination, and the like in a case of traveling from the position of the vehicle 1 to the destination by the personal mobility device 2 as the personal mobility device use information.

The vehicle 1 may further output destination arrival possibility information about the possibility of arriving at the destination in accordance with the user's schedule as the personal mobility device use information.

Figure 7:
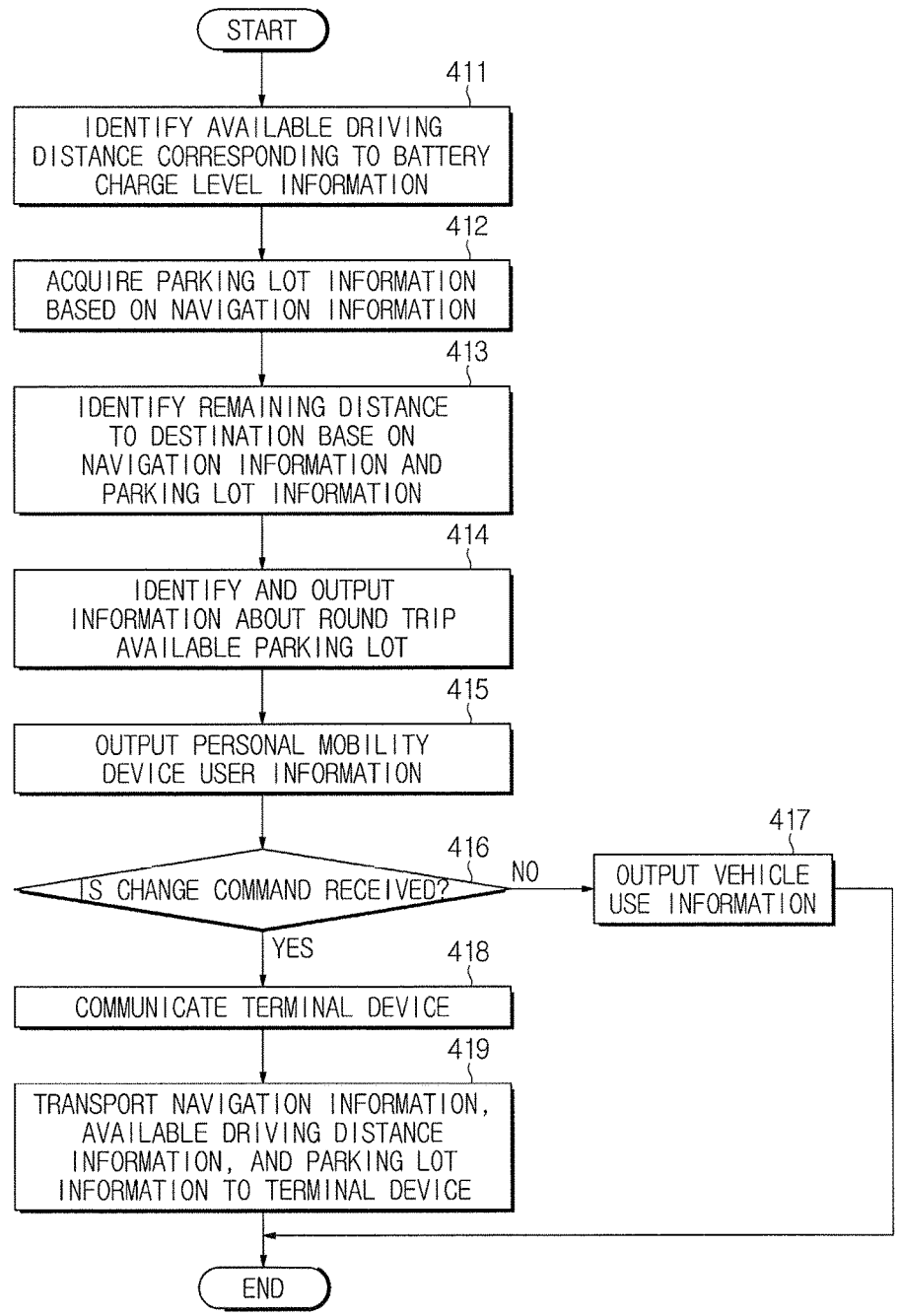
FIG. 7 is a flowchart of for describing a process of controlling the vehicle according to an exemplary embodiment when the information output mode is a manual mode.
Figure 8:
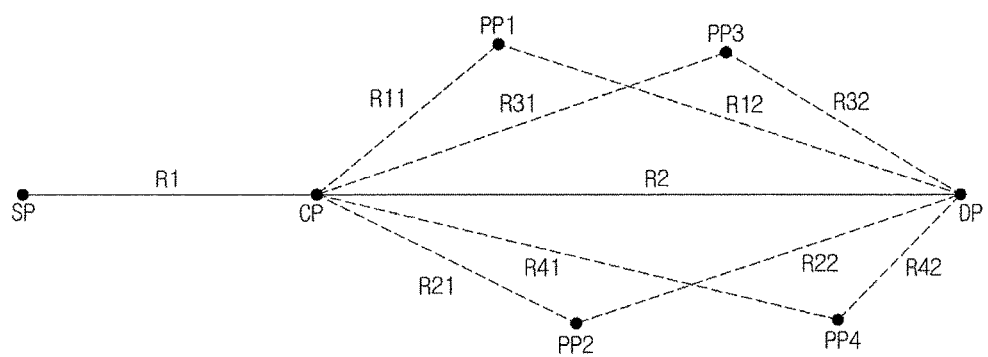
FIG. 8 is a diagram for describing a method of acquiring information about parking lots available to the personal mobility device in the manual information output mode.

FIG. 7 is a flowchart of for describing a process of controlling the vehicle when the information output mode is a manual mode. FIG. 8 is a diagram for describing a method of acquiring information about parking lots available to the personal mobility device in the manual information output mode.

As illustrated in FIG. 7, when the information output mode is the manual mode, the vehicle 1 identifies information about an available driving distance corresponding to the battery charge level of the personal mobility device 2 (411).

The vehicle 1 acquires information about at least one parking lot located between the current position and the destination based on route information of navigation information (412).

The vehicle 1 identifies a remaining distance between the at least one parking lot and the destination based on the acquired information about the at least one parking lot and navigation information (413).

When information about a plurality of parking lots is acquired, the vehicle 1 identifies the distance between each of the parking lots and the destination based on position information of the plurality of parking lots.

The vehicle 1 identifies round trip available parking lots by comparing the identified distance between each of the parking lots and the destination with the available driving distance, and outputs information about the identified parking lots (414).

The vehicle 1 acquires personal mobility device use information based on round trip available parking lot information and destination information of navigation information and outputs the acquired personal mobility device use information (415).

In this case, the vehicle 1 also outputs information about a travel distance and a travel time to the round trip available parking lot based on round trip available parking lot information, traffic information, and current position information.

Also, a plurality of parking lots to which the round trip is possible may be identified.

In this case, the vehicle 1 may output a plurality of pieces of parking lot information via the first user interface 126 and the user may select one piece of the output parking lot information. The vehicle 1 may acquire personal mobility device use information based on the selected parking lot information and navigation information.

Parking lot information output via the first user interface 126 may include information about position of the parking lot, travel distance to the destination, travel time to the destination, parking fee of the parking lots, and the number of parking spaces in the parking lots.

That is, the vehicle 1 outputs a remaining distance to the destination, a remaining time to the destination, and arrival time at the destination in a case of traveling from the parking lot to the destination by the personal mobility device 2.

An exemplary embodiment thereof will be described with reference to FIG. 8.

As illustrated in FIG. 8, the vehicle 1 generates information about routes R1 and R2 from an initial start position SP to the destination DP and outputs guide information based on route information and current position information.

When the manual mode is selected at the current position CP, the vehicle 1 acquires information about a plurality of parking lots PP1, PP2, PP3, and PP4 based on information about the remaining route R2, acquires distances R12, R22, R32, and R42 between respective parking lots and the destination, and determines whether a round trip between each parking lot and the destination is possible by comparing the acquired distances R12, R22, R32, and R42 with the available driving distance of the personal mobility device respectively.

Thus, the vehicle 1 may acquire information about a round trip available parking lot by identifying that a round trip distance between the parking lot and the destination is less than the available driving distance of the personal mobility device 2. In this case, the vehicle 1 may output information about the round trip available parking lot.

Assuming that a first parking lot PP1 and a second parking lot PP2 are round trip unavailable parking lots and a third parking lot PP3 and a fourth parking lot PP4 are round trip available parking lots, the vehicle 1 identifies a distance between the current position CP and the third parking lot PP3 (R31), a distance between the destination DP and the third parking lot PP3 (R32), a distance between the current position CP and the fourth parking lot PP4 (R41), and a distance between the destination DP and the fourth parking lot PP4 (R42), and outputs information about the respective identified distances.

The vehicle 1 also acquires a travel time of the vehicle 1 from the current position CP to the third parking lot PP3, a travel time of the personal mobility device from the third parking lot PP3 to the destination DP, a travel time of the vehicle 1 from the current position CP to the fourth parking lot PP4, and a travel time of the personal mobility device from the fourth parking lot PP4 to the destination DP based on information about distance between the current position and the destination, and the parking lot, outputs information about the acquired travel times, predict arrival time at the destination DP in the third parking lot PP3 and the fourth parking lot PP4, and outputs the predicted arrival time.

Thus, the user may efficiently select the parking lot from which the personal mobility device 2 is used while simultaneously parking the vehicle 1.

Also, the vehicle 1 may acquire information about a plurality of parking lots based on current position information and navigation information, acquire information about one-way trip available parking lots based on the acquired information about the plurality of parking lots, destination information, and information about an available driving distance of the personal mobility device 2, and output the acquired information about one-way trip available parking lots via the first user interface 126.

In the instant case, the vehicle 1 may acquire personal mobility device use information based on one-way trip available parking lot information and destination information, and output the acquired personal mobility device use information.

The vehicle 1 outputs a window to ask whether to change the transport device to the destination on the first user interface 126.

The vehicle 1 determines whether a transport device change command is input via the first user interface 126 (416). Upon determination that the transport device change command is not received, the vehicle 1 acquires vehicle use information based on current position information, destination information, and traffic information, and outputs the acquired vehicle use information (417).

In this case, the vehicle 1 outputs a remaining distance to the destination, a remaining time to the destination, and arrival time at the destination in a case of traveling from the current position to the destination by the vehicle 1.

Upon receiving a transport device change command via the first user interface 126 (416), the vehicle 1 communicates with the terminal device 3 (418), and transmits navigation information to the terminal device 3 upon successful communication with the terminal device 3.

The vehicle 1 transmits information about an available driving distance of the personal mobility device 2 and parking lot information to the terminal device 3 (419).

Upon receiving navigation information, the terminal device 3 may perform the navigation function based on current position information, acquire a travel distance of the personal mobility device 2 based on the navigation information and current position information, adjust an available driving distance of the personal mobility device based on the acquired travel distance, display the adjusted available driving distance, and display arrival time at the destination.

Also, the terminal device 3 may receive battery charge level information from the personal mobility device 2 via communication with the personal mobility device 2 and adjust the available driving distance based on the received battery charge level information.

Figure 9:
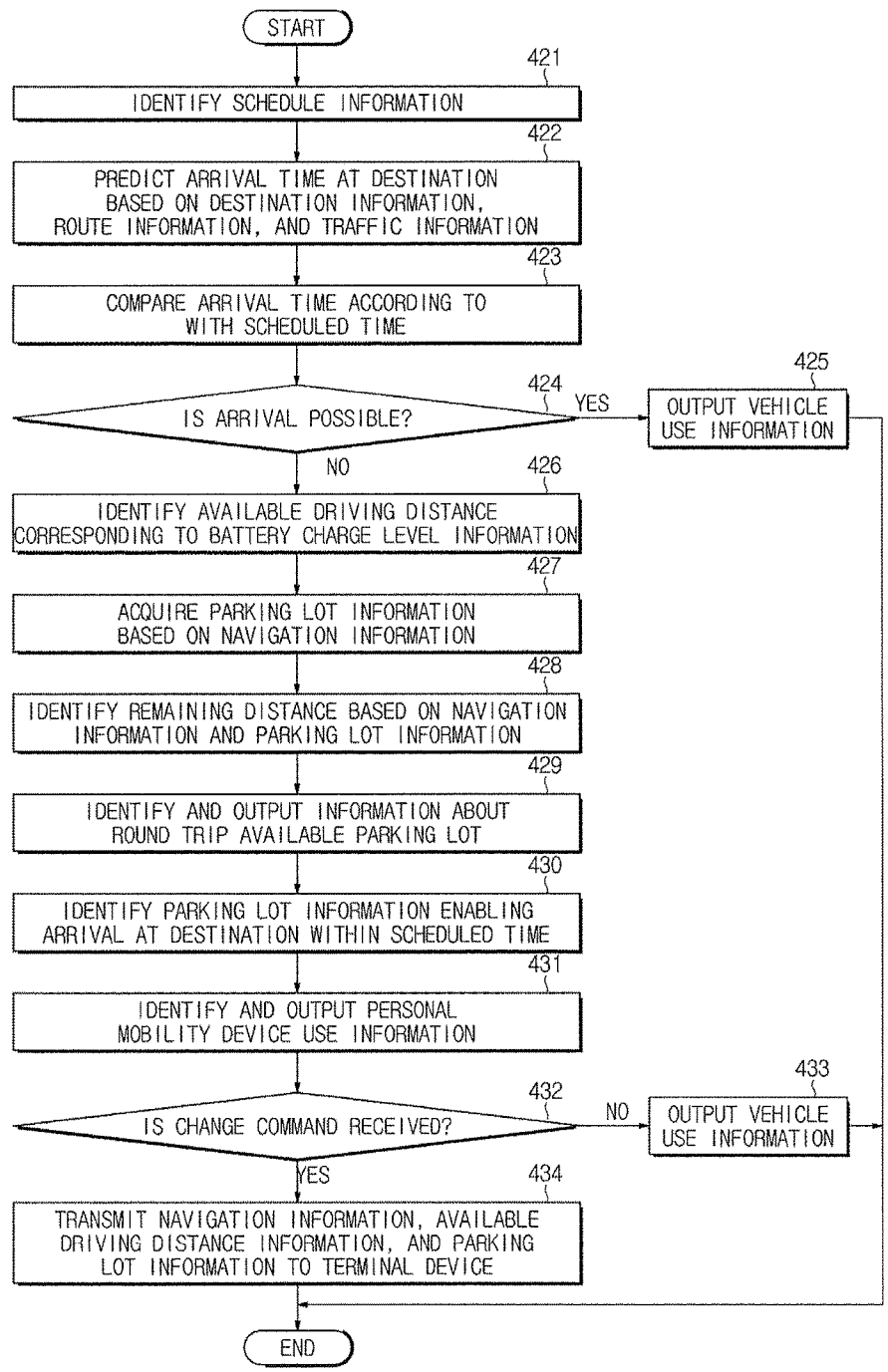
FIG. 9 is a flowchart for describing a process of controlling the vehicle when the information output mode is an automatic mode.
Figure 10:
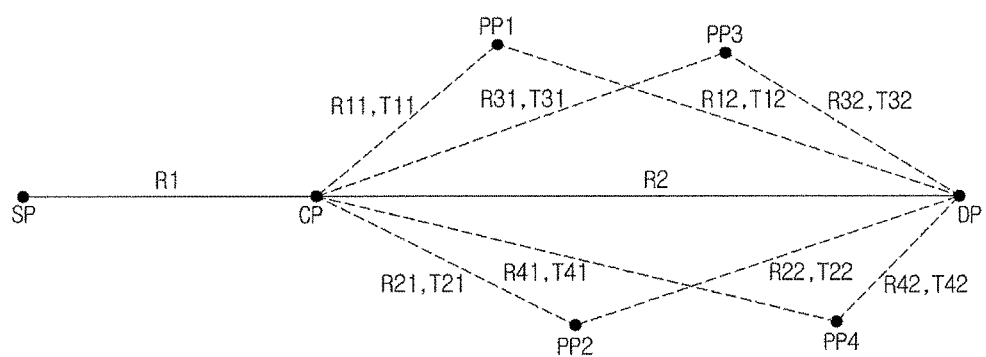
FIG. 10 is a diagram for describing a method of acquiring information about parking lots available to the personal mobility device in the automatic information output mode.

FIG. 9 is a flowchart for describing a process of controlling the vehicle when the information output mode is an automatic mode. FIG. 10 is a diagram for describing a method of acquiring information about parking lots available to the personal mobility device in the automatic information output mode.

As illustrated in FIG. 9, the vehicle 1 identifies information about a schedule of the user (421).

In this regard, the information about the schedule of the user may be identified by identifying schedule information of the user input via the first user interface 126 of the vehicle 1 and schedule information of the user received from the terminal device.

The schedule information of the user includes scheduled time on the basis of destination.

The vehicle 1 predicts arrival time at the destination based on destination information, current position information, route information, traffic information, and current time information (422) and determines the possibility of arriving at the destination within scheduled time (424) by comparing the predicted arrival time with the scheduled time (423).

Upon determination that the arrival at the destination is possible within the scheduled time, the vehicle 1 outputs vehicle use information based on the destination information, current position information, route information, and traffic information (425).

That is, the vehicle 1 may output a remaining distance and a remaining time to the destination and display arrival time at the destination in a case of traveling by the vehicle 1.

Upon determination that the arrival at the destination within the scheduled time is impossible, the vehicle 1 identifies information about an available driving distance of the personal mobility device 2 corresponding to a battery charge level thereof (426).

The vehicle 1 acquires information about at least one parking lot located between the current position and the destination based on current position information and route information of navigation information (427).

Then, the vehicle 1 identifies a remaining distance between each of the at least one parking lot and the destination based on the acquired information about at least one parking lot and destination information (428).

When information about a plurality of parking lots is acquired, the vehicle 1 identifies the distance between each of the parking lots and the destination based on position information of the plurality of parking lots.

The vehicle 1 acquires a round trip distance between each of the parking lots and the destination based on a remaining distance to the destination from each parking lot, compares the round trip distance between the parking lot and the destination with the available driving distance of the personal mobility device 2, and identifies information about a parking lot, a round trip distance of which is less than the available driving distance of the personal mobility device 2. In the instant case, the vehicle 1 may recognize the identified parking lot as a round trip available parking lot by the personal mobility device 2.

The vehicle 1 outputs round trip available parking lot information to the destination by the personal mobility device 2 (429).

Here, information about a plurality of round trip available parking lots, may be identified.

The vehicle 1 identifies a distance between the current position and the parking lot and a distance between the parking lot and the destination based on current position information, round trip available parking lot information, and destination information, predicts arrival time at the destination based on the identified distances and a traveling speed of the personal mobility device 2, and identifies information about a parking lot enabling the arrival at the destination within scheduled time by comparing the predicted arrival time with the scheduled time (430).

Also, when there is a plurality of round trip available parking lots, the vehicle 1 may predict arrival time at the destination from each of the plurality of parking lots.

When there is a plurality of parking lots enabling the arrival at the destination within the scheduled time, the vehicle 1 outputs information about the plurality of parking lots and the user may select one of the parking lots.

That is, the vehicle 1 may output information about the round trip available parking lot enabling the arrival within the scheduled time.

The vehicle 1 acquires personal mobility device use information based on the information about the round trip available parking lot enabling the arrival within the scheduled time, current position information, and destination information and outputs the acquired personal mobility device use information (431).

An exemplary embodiment thereof will be described with reference to FIG. 10.

As illustrated in FIG. 10, the vehicle 1 generates information about routes R1 and R2 from an initial start position SP to the destination DP and outputs guide information based on the route information and current position information.

When the automatic mode is selected at the current position CP, the vehicle 1 acquires information about a plurality of parking lots PP1, PP2, PP3, and PP4 based on information about the remaining route R2, acquires distances R12, R22, R32, and R42 between respective parking lots and the destination, and determines whether a round trip between each parking lot and the destination is possible by comparing the acquired distances R12, R22, R32, and R42 with the available driving distance of the personal mobility device 2, respectively.

Thus, the vehicle 1 may acquire information about a round trip available parking lot by identifying that a round trip distance between the parking lot and the destination is less than the available driving distance of the personal mobility device 2. In the instant case, the vehicle 1 may output information about the round trip available parking lot.

Assuming that a first parking lot PP1 and a second parking lot PP2 are round trip unavailable parking lots and a third parking lot PP3 and a fourth parking lot PP4 are round trip available parking lots, the vehicle 1 identifies a distance between the current position CP and the third parking lot PP3 (R31), a distance between the destination DP and the third parking lot PP3 (R32), a distance between the current position CP and the fourth parking lot PP4 (R41), and a distance between the destination DP and the fourth parking lot PP4 (R42), and outputs information about the respective identified distances.

The vehicle 1 acquires a travel time of the vehicle 1 from the current position CP to the third parking lot PP3, a travel time of the personal mobility device from the third parking lot PP3 to the destination DP, a travel time of the vehicle 1 from the current position CP to the fourth parking lot PP4, and a travel time of the personal mobility device from the fourth parking lot PP4 to the destination DP based on information about distances between the current position, the destination, and the parking lot, a driving speed of the vehicle 1, and a traveling speed of the personal mobility device 2, and predicts arrival time at the destination DP based on the acquired times.

The vehicle 1 may display a travel time from the current position to the third parking lot, a travel time from the third parking lot to the destination, a travel time from the current position to the fourth parking lot, and a travel time from the fourth parking lot to the destination and display arrival time at the destination when parked in the third parking lot PP3 and the fourth parking lot PP4, respectively.

Thus, the user may efficiently select the parking lot from which the personal mobility device is used while simultaneously parking the vehicle 1.

Also, the vehicle 1 may acquire information about a plurality of parking lots based on current position information and navigation information, acquire information about one-way trip available parking lots, based on the acquired information about the plurality of parking lots, destination information, and information about an available driving distance of the personal mobility device 2, identify a distance between the current position and the parking lot and a distance between the parking lot and the destination based on the information about the one-way trip available parking lot, current position information, and destination information, predict arrival time at the destination based on the identified distances, and identify a parking lot enabling an arrival at the destination within scheduled time by comparing the predicted arrival time with the scheduled time.

In this case, the vehicle 1 may also acquire personal mobility device use information based on the information about the one-way trip available parking lot enabling the arrival at the destination within the scheduled time and destination information, and output the acquired personal mobility device use information.

The vehicle 1 outputs a window to ask whether to change the transport device to the destination on the first user interface 126.

The vehicle 1 determines whether a transport device change command is input via the first user interface 126 (432). Upon determination that the transport device change command is not received, the vehicle 1 acquires vehicle use information based on current position information, destination information, and traffic information, and outputs the acquired vehicle use information (433).

In this case, the vehicle 1 outputs a remaining distance to the destination, a remaining time to the destination, and arrival time at the destination in a case of traveling from the current position to the destination by the vehicle 1.

Upon determination that a transport device change command is input via the first user interface 126, the vehicle 1 communicates with the terminal device 3, and transmits navigation information to the terminal device 3 upon successful communication with the terminal device 3.

The vehicle 1 transmits information about an available driving distance of the personal mobility device 2, schedule information, and parking lot information to the terminal device 3 (434).

Upon receiving navigation information, the terminal device 3 may perform the navigation function based on current position information, acquire a travel distance of the personal mobility device 2 based on the navigation information and current position information, adjust an available driving distance of the personal mobility device 2 based on the acquired travel distance, display the adjusted available driving distance, and display arrival time at the destination and scheduled time.

Also, the terminal device 3 may receive battery charge level information from the personal mobility device 2 via communication with the personal mobility device 2 and adjust the available driving distance based on the received battery charge level information.

Figure 11:
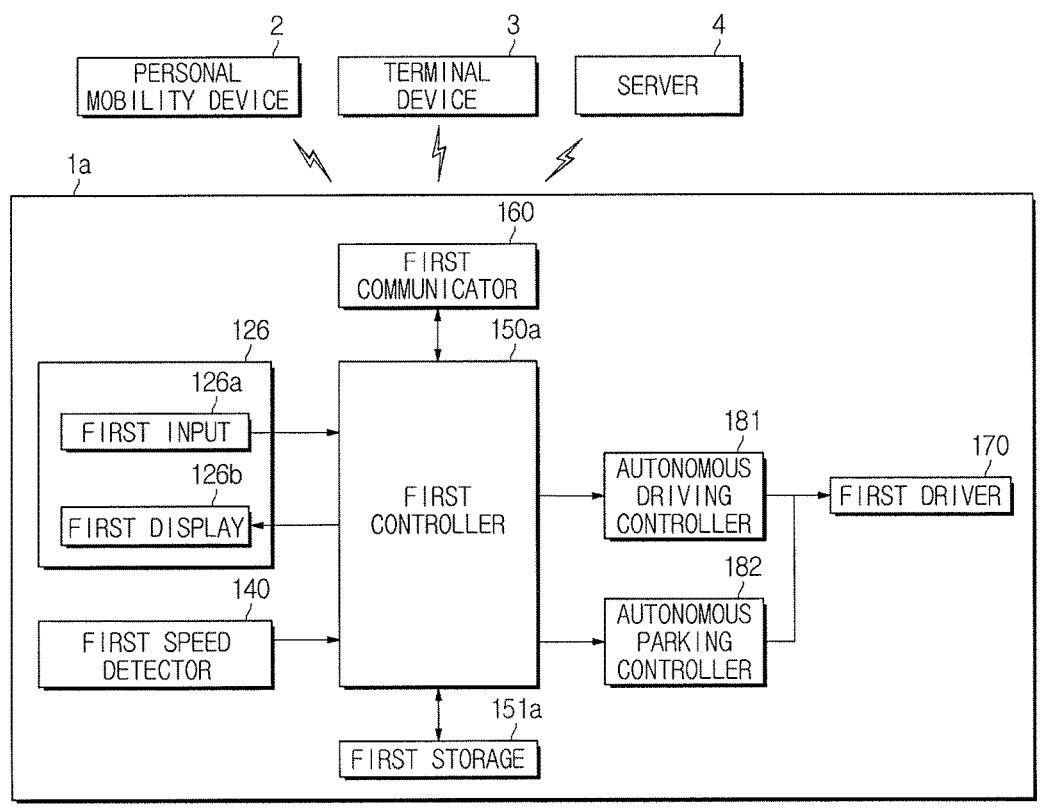
FIG. 11 is a control block diagram of a vehicle according to another exemplary embodiment.

FIG. 11 is a control block diagram of a vehicle 1a according to another exemplary embodiment.

As illustrated in FIG. 11, the vehicle 1a includes a user interface 126, a first speed detector 140, a first controller 150a, a first storage 151a, a first communicator 160, a first driver 170, an autonomous driving controller 181, and an autonomous parking controller 182.

The user interface 126, the first speed detector 140, the first storage 151a, the first storage 151a, the first communicator 160, and the first driver 170 of the vehicle 1a are the same as those of the vehicle 1 according to the previous embodiment, and thus descriptions thereof will not be repeated.

The same configuration of the first controller 150a as that of the first controller 150 will be briefly described.

The first controller 150a receives traffic information from the server 4, receives schedule information of the user from the terminal device 3, and receives detected battery charge level information from the personal mobility device 2.

When the navigation function is selected and destination information is input, the first controller 150s generates route information based on current position information and destination information, matches the generated route information to map information, and controls output of the matched map information and route information.

The first controller 150a may generate optimal route information by using traffic information while generating the route information.

The first controller 150a predicts arrival time at the destination based on the navigation information, traffic information, and driving speed information and controls output of the predicted arrival time.

Here, the navigation information may include current position information, destination information, route information, intersection information, and the like.

When the navigation function is selected, the first controller 150 identifies presence of the pre-registered personal mobility device. When the pre-registered personal mobility device is absent, the first controller 150a controls output of information notifying the absence of the personal mobility device.

When the information output mode is the manual mode, the first controller 150a acquires vehicle use information and personal mobility device use information, respectively, based on the navigation information, traffic information, battery charge level information, and driving speed information and controls output of the acquired vehicle use information and personal mobility device use information.

When the information output mode is the automatic mode, the first controller 150a acquires vehicle use information and personal mobility device use information, respectively, based on schedule information, navigation information, traffic information, driving speed information of the vehicle 1a, battery charge level information, and traveling speed information of the personal mobility device 2 and controls output of the acquired vehicle use information and personal mobility device use information.

In the manual information output mode, the first controller 150a may determine availability of the personal mobility device 2 by acquiring an available driving distance based on detected battery charge level information, and determining the possibility of a round trip by the personal mobility device based on information about a distance between the current position and the destination and information about a distance between the destination and a parking lot.

In the automatic information output mode, the first controller 150a may determine availability of the personal mobility device 2 by determining whether arrival time at the destination determined based on the current position, the possibility of the round trip between the destination and the parking lot, the distance between the current position and the destination, and the traveling speed of the personal mobility device 2 is within scheduled time of the schedule information.

The first controller 150a acquires parking lot information based on the current position information and destination information, controls output of the acquired parking lot information, controls driving of the vehicle 1a based on the acquired parking lot information, and controls autonomous parking when the current position of the vehicle 1a is a parking lot.

The first controller 150a may acquire information about at least one of the available driving distance and available driving time of the personal mobility device 2 based on the battery use table and detected battery charge level in a case of acquiring the personal mobility device use information and acquire information indicating that the personal mobility device 2 is available or unavailable based on the acquired information.

In this regard, the vehicle use information refers to distance and time information in a case of traveling from the current position to the destination by the vehicle 1a as a transport device and includes information about a remaining distance from the current position to the destination, a remaining time from the current position to the destination, and arrival time at the destination.

The personal mobility device use information refers to distance and time information in a case of traveling from the current position to the destination by the personal mobility device 2 as a transport device and includes information about a remaining distance from the current position to the destination, a remaining time from the current position to the destination, and arrival time at the destination.

The personal mobility device use information may further include information about a start position and a start time of using the personal mobility device 2 in a case of using the personal mobility device.

The first controller 150a may identify a fuel level of the vehicle 1a, identify information about an available driving distance of the vehicle 1a corresponding to the identified fuel level, control output of the information about the available driving distance of the vehicle 1a, and select the parking lot based on the information about the available driving distance of the vehicle 1a during autonomous driving and autonomous parking.

Here, the fuel level of the vehicle 1a may be detected by a fuel level detector.

The first controller 150a may also automatically select at least one parking lot among a plurality of parking lots based on the fuel level of the vehicle 1a, parking lot position information, and gas station position information and output information about the selected parking lot.

When the personal mobility device 2 is selected as the transport device, the first controller 150a transmits at least one of navigation information, battery charge level information of the personal mobility device 2, parking lot information, and schedule information of the user to the terminal device 3.

The navigation information transmitted to the terminal device 3 may include current position information, route information, destination information, parking lot information, and the like.

When the personal mobility device 2 is selected as the transport device, the first controller 150a may re-generate route information based on the current position information and destination information and transmit the re-generated route information to the terminal device 3. This is because the first controller 150a considers that the personal mobility device 2 may travel on the sidewalk. The first controller 150a may search for an optimal route and provide information about the searched route to the user.

The first controller 150a may also output one-way trip availability information and round trip availability information by the personal mobility device 2 based on the battery charge level of the personal mobility device 2 and the remaining distance from the current position to the destination.

When information about a plurality of parking lots is acquired, the first controller 150a gives priorities to a plurality of pieces of parking lot information and controls autonomous driving and autonomous parking based on the priorities.

The first controller 150a repeats a process of identifying parking lot information having the highest priority, controlling autonomous driving based on the identified parking lot information, identifying another parking lot information having a second highest priority when there is no parking space in the parking lot having the highest priority, and controlling autonomous driving based on the identified parking lot information having the second highest priority.

When the position of the parking lot is changed during autonomous driving and autonomous parking, the first controller 150a may also transmit information about the changed position of the parking lot to the terminal device 3.

When the personal mobility device 2 is selected as the transport device, the autonomous driving controller 181 controls autonomous parking based on parking lot information selected by the user and current position information.

The autonomous parking controller 182 controls autonomous parking when the current position is the parking lot selected by the user.

The vehicle 1a may further include an image acquisition device and an obstacle detector to control autonomous driving and autonomous parking.

The first controller 150a may be implemented using a memory configured to store data for algorithms to control operation of elements of the vehicle 1a or programs constructed from algorithms, and a processor or configured to execute the operation by using data stored in the memory. In this case, the memory and the processor may be implemented using separate chips or integrated into a single chip.

The first storage 151a may be implemented using a non-volatile memory device including cache memory, Read Only Memory (ROM), Programmable ROM (PROM), Erasable Programmable ROM (EPROM), Electrically Erasable Programmable ROM (EEPROM), and flash memory, a volatile memory device including Random Access Memory (RAM), or a storage medium including Hard Disk Drive (HDD) and CD-ROM, without being limited thereto.

The first storage 151*a* may be a memory implemented as a separate chip from the processor described above regarding the first controller 150*a* or a single chip integrated with the processor.

The first communicator 160 communicates with the personal mobility device 2, the terminal device 3, and the server 4.

The first communicator 160 may include a wired or wireless communication device.

The first communicator 160 may further include a GPS receiver to acquire a current position of the vehicle 1*a*.

The first driver 170 drives various driving devices related to driving and braking of the vehicle 1*a* in accordance with driver's intention of driving and braking the vehicle 1*a* while traveling by the vehicle 1*a* and stops driving of the various driving devices when the vehicle 1*a* is not in use.

The personal mobility device 2 communicates with the vehicle 1*a*, detects the battery charge level, and transmits information about the detected battery charge level and the battery use table to the vehicle 1*a* and the terminal device 3.

The terminal device 3 communicates with the vehicle 1*a* 1, receives at least one of navigation information, information about the personal mobility device 2, and schedule information from the vehicle 1*a*, guides a route based on the received navigation information, outputs the received information about the battery charge level of the personal mobility device 2, and outputs information about an available driving distance corresponding to the battery charge level of the personal mobility device 2.

The terminal device 3 may also communicate with the personal mobility device 2. In this case, the terminal device 3 may periodically receive information about battery charge levels of the personal mobility device 2 and output the information about battery charge levels and available driving distances of the personal mobility device 2.

The terminal device 3 may include mobile communication and portable devices including smartphones, tablets, PDAs, and wearable devices.

The server 4 may transmit traffic information to the vehicle 1*a* or the terminal device 3.

The personal mobility device 2, the terminal device 3, and the server 4 are the same as those described above according to the previous embodiment, and thus descriptions thereof will not be repeated herein.

Figure 12:
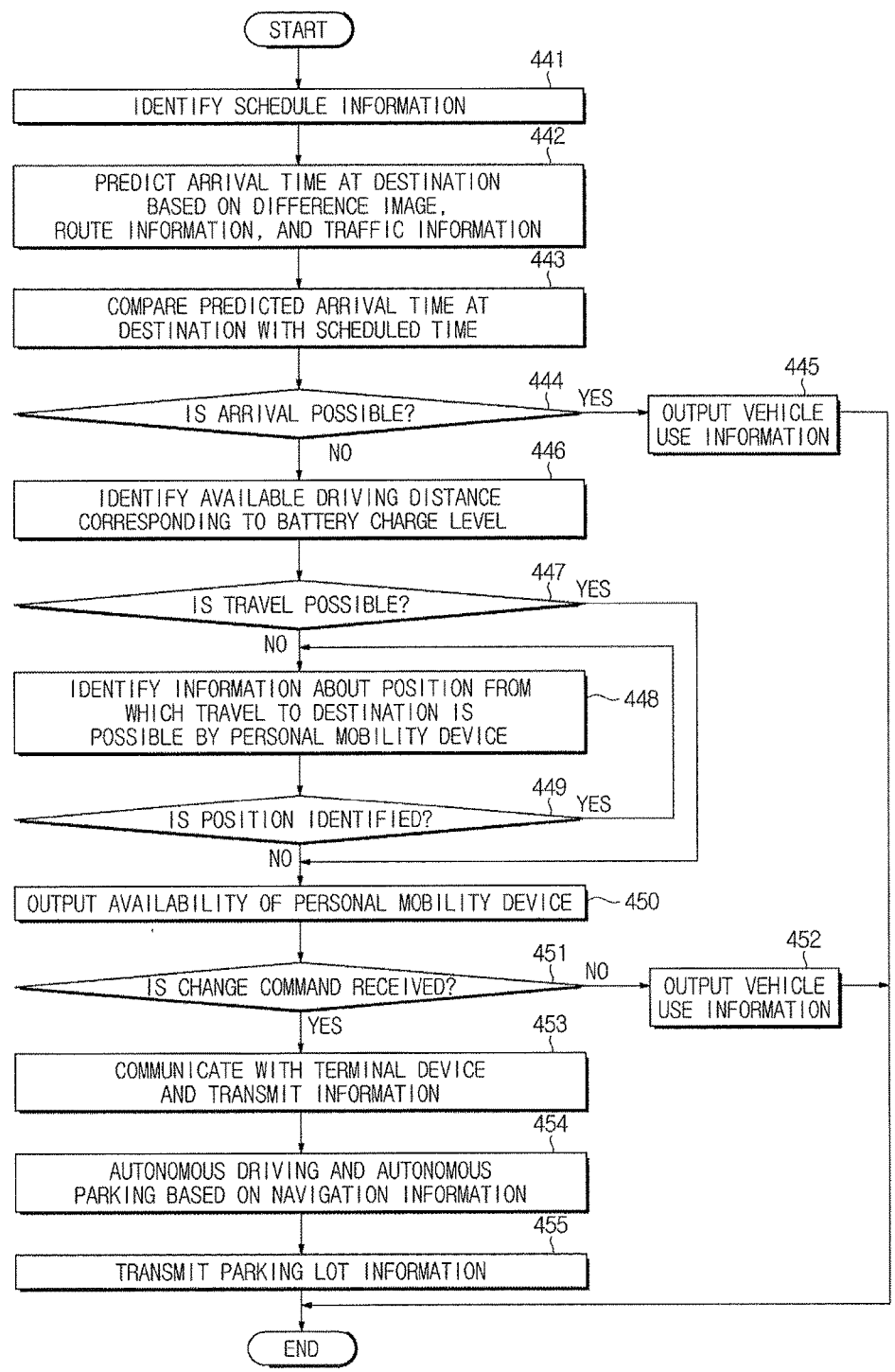
FIG. 12 is a flowchart for describing a process of controlling the vehicle according to another exemplary embodiment.

FIG. 12 is a flowchart for describing a process of controlling the vehicle 1*a*. The same control configuration for the vehicle 1*a* as that for the vehicle 1 according to the previous embodiment will be briefly described.

As illustrated in FIG. 12, the vehicle 1*a* identifies information about a schedule of the user (441).

The information about the schedule of the user includes scheduled time on the basis of destination.

The vehicle 1*a* predicts arrival time at the destination based on destination information, current position information, route information, traffic information, and current time information (442) and determines the possibility of arriving at the destination within scheduled time in a case of traveling by the vehicle 1*a* (444) by comparing the predicted arrival time with the scheduled time (443).

Upon determination that the arrival at the destination is possible within the scheduled time, the vehicle 1*a* outputs vehicle use information based on the destination information, current position information, route information, and traffic information (445).

That is, the vehicle 1*a* may output a remaining distance and a remaining time to the destination and display arrival time at the destination in a case of traveling by the vehicle 1*a*.

Upon determination that the arrival at the destination within the scheduled time is impossible, the vehicle 1*a* identifies an available driving distance of the personal mobility device 2 corresponding to a battery charge level thereof (446).

The vehicle 1*a* identifies a distance between the current position and the destination based on current position information and destination information, and determines whether a travel from the current position to the destination by the personal mobility device 2 is possible by comparing the identified distance with the available driving distance of the personal mobility device 2.

Upon determination that the travel from the current position to the destination by the personal mobility device 2 is possible, the vehicle 1*a* identifies a distance between the current position and the destination based on current position information and destination information, predicts arrival time at the destination based on the identified distance and the traveling speed of the personal mobility device 2, and determines whether a travel to the destination by the personal mobility device 2 is possible by comparing the predicted arrival time with scheduled time (447).

That is, upon determination that the predicted arrival time is within the scheduled time, the vehicle 1*a* determines that the travel to the destination by the personal mobility device 2 is possible.

Upon determination that the travel to the destination by the personal mobility device 2 is possible, the vehicle 1*a* outputs personal mobility device use information based on current position information, destination information, and information about traveling speed of the personal mobility device 2 (450).

That is, the vehicle 1*a* outputs information indicating that the travel from the current position to the destination by the personal mobility device 2 is possible via the first user interface 126.

On the contrary, upon determination that the travel from the current position to the destination by the personal mobility device 2 is impossible, the vehicle 1*a* identifies information about a position from which a travel to the destination is possible by the personal mobility device 2 based on traffic information, route information, and information about speed of the vehicle 1*a* (448).

Then, upon determination that the travel from the current position to the destination by the personal mobility device 2 is possible based on the identified position information while the vehicle is running (449), the vehicle 1*a* outputs personal mobility device use information based on the current position information, destination information, and information about the traveling speed of the personal mobility device 2 (450).

The vehicle 1*a* may also identify a distance between the current position and the destination based on current position information and destination information, predict arrival time at the destination based on the identified distance and the traveling speed of the personal mobility device 2, and output the predicted arrival time. The vehicle outputs information indicating that the travel from the current position to the destination by the personal mobility device 2 is possible via the first user interface 126.

Upon determination that the predicted arrival time is not within the scheduled time, the vehicle 1*a* may re-identify information about a position from which the travel to the destination by the personal mobility device 2 is possible based on current position information, destination information, traffic information, route information, and information about the traveling speed of the vehicle 1a.

The vehicle 1a outputs a window to ask whether to change the transport device to the destination on the first user interface 126.

The vehicle 1a determines whether a transport device change command is input via the first user interface 126 (451). Upon determination that the transport device change command is not received, the vehicle 1a acquires vehicle use information based on current position information, destination information, and traffic information, and outputs the acquired vehicle use information (452). In the instant case, the vehicle 1a outputs a remaining distance to the destination, a remaining time to the destination, and arrival time at the destination in a case of traveling from the current position to the destination by the vehicle 1a.

Upon determination that the transport device change command is received via the first user interface 126, the vehicle 1a communicates with the terminal device 3 and transmits navigation information to the terminal device 3 upon successful communication with the terminal device 3.

The vehicle 1a transmits information about an available driving distance of the personal mobility device 2 and schedule information to the terminal device 3 (453).

The vehicle 1a performs autonomous driving to the destination based on current position information and destination information from navigation information, performs autonomous parking upon arriving at the destination (454), and transmit position information about the parked vehicle 1a to the terminal device 3 (455).

Also, the vehicle 1a may acquire information about at least one parking lot located between the current position and the destination based on current position information and destination information from navigation information and perform autonomous driving and autonomous parking based on the acquired information about the parking lot.

When information about a plurality of parking lots is acquired, the vehicle 1a may select information about a parking lot closest to the destination among the plurality of parking lots.

The vehicle 1a may also select one of the parking lots based on information about the plurality of parking lots, fuel level information of the vehicle 1a, and gas station information.

The vehicle 1a may transmit the information about the plurality of parking lots to the terminal device 3 and select one of the parking lots among the plurality of parking lots based on information about parking lots received from the terminal device 3.

In this regard, the information about parking lots received from the terminal device 3 may be information about a parking lot selected by the user.

The vehicle 1a gives priorities to a plurality of pieces of parking lot information and performs autonomous driving and autonomous parking based on parking lot information having the highest priority.

Upon completion of parking, the vehicle 1a may transmit information about the parking lot where the vehicle is parked to the terminal device 3.

In the instant case, the terminal device 3 may generate route information from the destination to the parking lot based on destination information and parking lot information and output guide information based on the generated route information.

FIG. 12 illustrates a method of controlling the vehicle 1a in the automatic information output mode. A method of controlling the vehicle 1a in the manual information output mode will be briefly described.

When the information output mode is the manual mode, the vehicle 1a identifies information about an available driving distance corresponding to the battery charge level of the personal mobility device 2.

Then, the vehicle 1a identifies a distance between the current position and the destination based on current position information and destination information, determines whether a travel from the current position to the destination by the personal mobility device 2 is possible by comparing the identified distance with the available driving distance of the personal mobility device 2, and outputs information indicating that the personal mobility device 2 is available upon determination that the travel from the current position to the destination by the personal mobility device 2 is possible.

Upon determination that the travel from the current position to the destination by the personal mobility device 2 is impossible, the vehicle 1a identifies information about a position from which the travel to the destination by the personal mobility device 2 is possible based on traffic information, route information, and information about speed of the vehicle 1a, and outputs information indicating that the personal mobility device 2 is available upon determination that the current position is the position from which a travel to the destination by the personal mobility device 2 is possible.

The vehicle 1a outputs a window to ask whether to change the transport device to the destination on the first user interface 126.

The vehicle 1a determines whether a transport device change command is received via the first user interface 126. Upon determination that the transport device change command is not received, the vehicle 1a acquires vehicle use information based on current position information, destination information, and traffic information, and outputs the acquired vehicle use information.

In the instant case, the vehicle 1 outputs a remaining distance to the destination, a remaining time to the destination, and arrival time at the destination in a case of traveling from the current position to the destination by the vehicle 1a.

Upon determination that the transport device change command is received via the first user interface 126, the vehicle 1a communicates with the terminal device 3 and transmits navigation information to the terminal device 3 upon successful communication with the terminal device 3

The vehicle 1a transmits information about an available driving distance of the personal mobility device 2 and schedule information to the terminal device 3.

The vehicle 1a performs autonomous driving to the destination based on current position information and destination information from navigation information and autonomous parking upon arriving at the destination.

Figure 13:
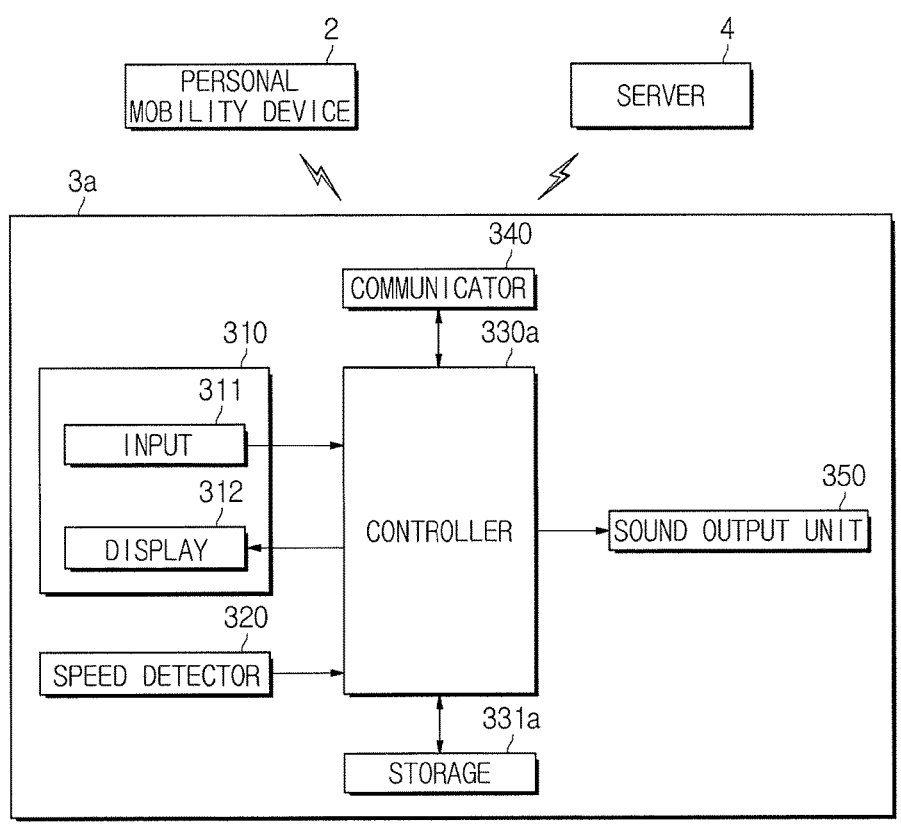
FIG. 13 is a control block diagram of a terminal device according to another exemplary embodiment.

FIG. 13 is a control block diagram of a terminal device 3a according to another exemplary embodiment.

The terminal device 3a according to another exemplary embodiment is a device performing a navigation function and communicating with the personal mobility device interacting with the navigation function.

The terminal device 3a acquires vehicle use information and personal mobility device use information based on navigation information regarding the navigation function and information about the personal mobility device and provides the user with the acquired vehicle use information and personal mobility device use information, so that the user may recognize a position and time of conversion between the vehicle and the personal mobility device.

Here, the vehicle may be a vehicle owned by the user or vehicles owned by others including a bus and a vehicle.

The present embodiment will be exemplarily described based on outputting vehicle use information and personal mobility device use information in a case of traveling by a vehicle owned by the user.

As illustrated in FIG. 13, the terminal device 3a includes a user interface 310, a speed detector 320, a controller 330a, a storage 331a, a communicator 340, and a sound output device 350.

The user interface 310 receives an input of an operation command from a user and outputs operation information.

The user interface 330 may perform one or more functions selected from navigation function, audio function, video function, radio function, web search function, broadcasting function (i.e., DMB function, the Internet function, phone function, and text transmit/receive function.

The user interface 330 includes an input 311 to receive the operation command and a display 312 to output the operation information.

The input 311 may include at least one of a touch panel to receive a touch signal and a button to select an operation command.

The input 311 may receive destination information while performing the navigation function.

The input 311 may receive an input of information output mode, information about a transport device selected by the user, and information about a parking lot selected by the user.

In this regard, the transport device includes vehicles and personal mobility devices, and the information output mode includes a manual mode in which personal mobility device use information is acquired based on a select command of the user and an automatic mode in which personal mobility device use information is automatically acquired based on information about a schedule of the user.

The input 311 receives a pairing command to be paired with the personal mobility device.

The input 311 may also receive an input of information about the schedule of the user.

The display 312 may include a flat panel display to display the operation information as an image.

The display 312 may display at least one selected from map information, route information, current position information, driving speed information of the vehicle, destination information, and traffic information as an image while performing the navigation function.

The display 312 may display information about absence of the personal mobility device, notification about low battery of the personal mobility device, and information about communication connection with the personal mobility device.

The display 312 may display the information output mode and may further display personal mobility device use information and vehicle use information.

In this regard, the personal mobility device use information may include information about at least one of an available driving distance and an available driving time corresponding to a remaining battery charge level in a case of traveling by the personal mobility device and may further include information about arrival time at the destination.

The vehicle use information may further include information about arrival time at the destination in a case of traveling by the vehicle.

The input 311 and the display 312 of the user interface 330 may be implemented using a touch screen in which a touch panel and a display panel are integrated.

The speed detector 320 detects a traveling speed of the terminal device 3a.

The speed detector 320 may further include an acceleration sensor to detect acceleration of the terminal device 3a.

The speed detector 320 may indirectly detect the traveling speed of the personal mobility device 2 or vehicle 1.

The controller 330 may periodically identify current position received via a GPS receiver and predict information about traveling speeds of the personal mobility device and the vehicle based on variations in the current position with time.

The controller 330 receives traffic information from the server 4 and receives detected battery charge level information from the personal mobility device 2.

The controller 330 may receive a battery use table from the personal mobility device 2 and store the received battery use table.

In this regard, the battery use table includes a list in which available driving distances and available driving times are matched to battery charge levels.

When the navigation function is selected and destination information is input, the controller 330 generates route information based on current position information and destination information, matches the generated route information to map information, and controls output of the matched map information and route information.

While generating the route information, the controller 330 may generate and output a plurality of pieces of route information and store one piece of route information selected by the user among a plurality of pieces of route information.

The controller 330 may generate optimal route information by using traffic information while generating the route information.

The controller 330 may predict arrival time at the destination based on the navigation information, traffic information, and driving speed information and control output of the predicted arrival time.

Here, the navigation information may include current position information, destination information, route information, intersection information, and the like.

When the navigation function is selected, the controller 330 identifies presence of the pre-registered personal mobility device. When the pre-registered personal mobility device is absent, the first controller 330 controls output of information notifying the absence of the personal mobility device.

The controller 330 may identify the presence of the pre-registered personal mobility device by checking whether a communicable personal mobility device is found.

Upon receiving the detected battery charge level, the controller 330 compares the detected battery charge level with a reference battery charge level and controls output of notification about low battery of the personal mobility device 2 when the detected battery charge level is less than the reference battery charge level.

When the information output mode is the manual mode, the controller 330 acquires vehicle use information and personal mobility device use information, respectively, based on navigation information, traffic information, battery charge level information, and driving speed information of the vehicle and controls output of the acquired vehicle use information and personal mobility device use information.

When the information output mode is the automatic mode, the controller 330 acquires vehicle use information and personal mobility device use information, respectively, based on schedule information, navigation information, traffic information, driving speed information of the vehicle, and battery charge level information and controls output of the acquired vehicle use information and personal mobility device use information.

In the manual information output mode, the controller 330 may determine availability of the personal mobility device by acquiring an available driving distance based on detected battery charge level information, acquiring remaining distance information based on current position information (or parking lot position information) and destination information, and determining the possibility of a round trip between the current position and the destination based on the acquired available driving distance and remaining distance information.

In the automatic information output mode, the controller 330 may determine availability of the personal mobility device by determining the possibility of a round trip between the current position and the destination and the possibility of arrival within scheduled time of the schedule information.

In the automatic information output mode, the controller 330 may acquire position information about round trip available parking lot by the personal mobility device 2 based on navigation information and the detected battery charge level, select a parking lot enabling arrival within scheduled time based on speed information of the personal mobility device among the acquired position information about parking lots, and control output of position information of the selected parking lot.

In this case, the round trip refers to a round trip between the destination and the parking lot.

Speed information of the personal mobility device may include at least one selected from an average speed, a maximum speed, and a minimum speed of the personal mobility device.

When personal mobility device use information is acquired, the controller 330 may acquire information about at least one of the available driving distance and available driving time based on the battery use table and detected battery charge level and acquire information indicating that the personal mobility device is available or unavailable based on the acquired information.

In this regard, the vehicle use information refers to distance and time information in case of traveling from the current position to the destination by the vehicle as a transport device and includes information about a remaining distance from the current position to the destination, a remaining time from the current position to the destination, and arrival time at the destination.

The personal mobility device use information refers to distance and time information in case of traveling from the current position to the destination by the personal mobility device as a transport device and includes information about a remaining distance from the current position to the destination, a remaining time from the current position to the destination, and arrival time at the destination.

In this case, the current position may include a parking available position, and the parking available position may include a position of the parking lot.

The personal mobility device use information may further include information about a start position and a start time of using the personal mobility device in case of using the personal mobility device.

The controller 330 may search for a parking lot based on the navigation information and traffic information and control output of information about the searched parking lot.

In this regard, the information about the parking lot may include information about position of the parking lot, parking fee of the parking lot, a travel time to the parking lot, a distance to the parking lot, and parking space of the parking lot.

When the personal mobility device is selected as the transport device, the controller 330 may re-generate route information based on current position information and destination information.

This is because the controller 330 considers that the personal mobility device 2 may travel on the sidewalk. The controller 330 may search for an optimal route and provide information about the searched route to the user.

The controller 330 may acquire information about a remaining distance and a remaining time to the destination based on the current position information and control output of the acquired information. The controller 330 may also predict information about arrival time at the destination based on the information about the remaining distance and a traveling speed of the personal mobility device and control output of the predicted arrival time information.

The controller 330 may periodically identify battery charge level information of the personal mobility device, adjust available driving distance information of the personal mobility device based on the identified battery charge level information of the personal mobility device, and output the adjusted available driving distance information.

The controller 330 may also output one-way trip availability information and round trip availability information by the personal mobility device based on the battery charge level of the personal mobility device and the remaining distance from the current position to the destination.

When the vehicle has autonomous driving and autonomous parking functions, the controller 330 may also determine personal mobility device availability information based on current position information, destination information, and available driving distance information of the personal mobility device.

The controller 330 may identify a distance between the current position and the destination based on current position information and destination information, determine whether a travel from the current position to the destination by the personal mobility device is possible by comparing the identified distance with the available driving distance of the personal mobility device, and output information indicating that the personal mobility device is available upon determination that the travel from the current position to the destination by the personal mobility device is possible.

Upon determination that the travel from the current position to the destination by the personal mobility device 2 is impossible, the controller 330 may identify information about a position from which the travel to the destination by the personal mobility device is possible based on traffic information, route information, and speed information of the vehicle, and output the identified position.

Upon determination that the travel from the current position to the destination by the personal mobility device is possible based on the identified position information while the vehicle is running, the controller 330 outputs information indicating that the personal mobility device is available.

The storage 331 stores identification information of the pre-registered personal mobility device, the battery use table of the personal mobility device, and information about maximum and minimum speeds of the personal mobility device.

The storage 331 may also store a reference battery charge level of the battery to inform a low battery level of the personal mobility device.

The storage 331 may also store schedule information of the user.

The controller 330 may be implemented using a memory configured to store data for algorithms to control operation of elements of the terminal device 3a or programs constructed from algorithms, and a processor or configured to execute the operation by using data stored in the memory. In the instant case, the memory and the processor may be implemented using separate chips or integrated into a single chip.

The storage 331 may be implemented using a non-volatile memory device including cache memory, Read Only Memory (ROM), Programmable ROM (PROM), Erasable Programmable ROM (EPROM), Electrically Erasable Programmable ROM (EEPROM), and flash memory, a volatile memory device including Random Access Memory (RAM), or a storage medium including Hard Disk Drive (HDD) and CD-ROM, without being limited thereto.

The storage 311 may be a memory implemented as a separate chip from the processor described above regarding the controller 330 or a single chip integrated with the processor.

The communicator 340 communicates with the personal mobility device 2 and the server 4.

The communicator 340 may include a wired or wireless communication device.

The communicator 340 may further include a GPS receiver to acquire a current position of the terminal device 3a.

The sound output device 350 outputs operation information of the terminal device 3a as a sound.

The sound output device 350 may output navigation information as a sound while performing the navigation function.

The sound output device 350 may output a request for charging the personal mobility device as a sound.

The personal mobility device 2 communicates with the terminal device 3a, detects the battery charge level, and transmits information about the detected battery charge level and the battery use table to the terminal device 3a.

The server 4 transmits traffic information to the terminal device 3a.

The personal mobility device 2 and the server 4 are as described above, and descriptions thereof will not be repeated.

Figure 14:
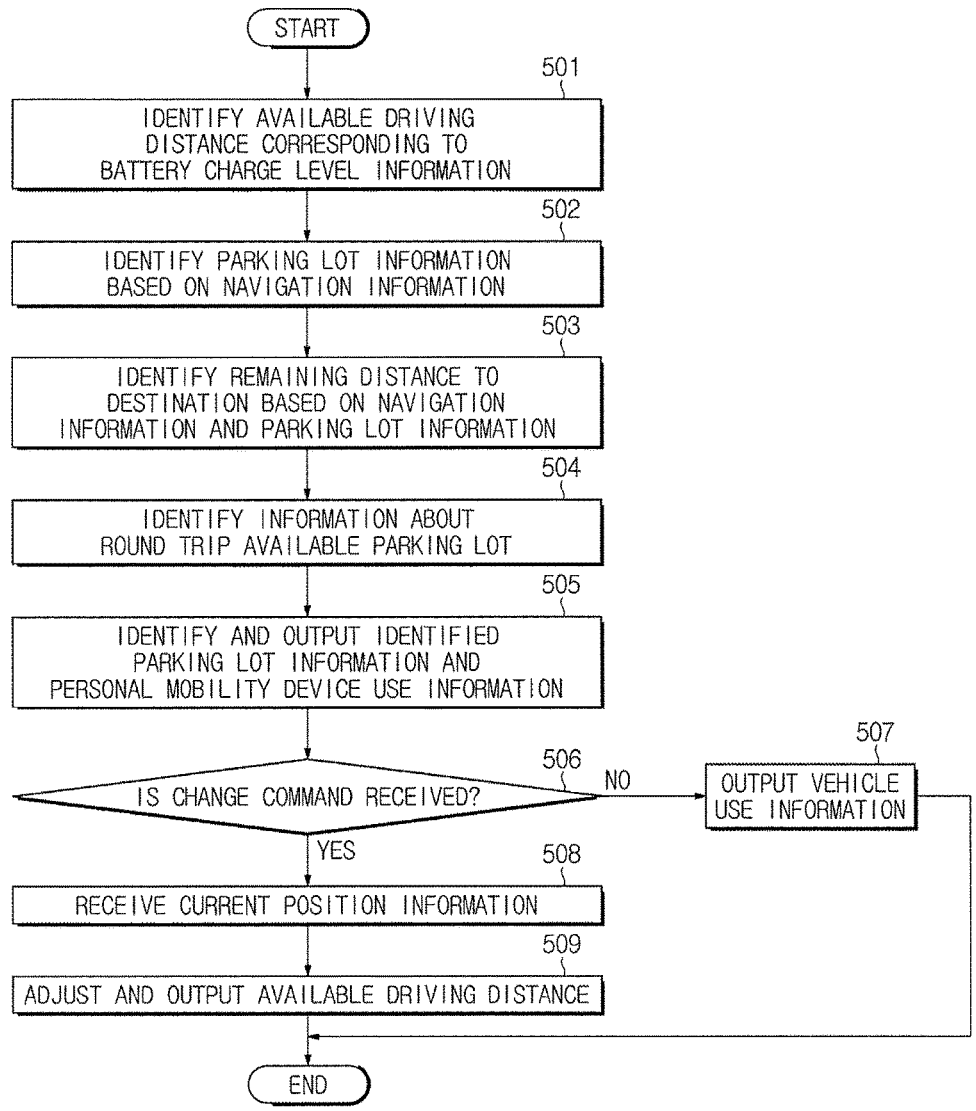
FIG. 14 is a flowchart for describing a process of controlling the terminal device in a manual information output mode.

FIG. 14 is a flowchart for describing a process of controlling the terminal device in a manual information output mode.

As illustrated in FIG. 14, when the navigation function is selected by the user while the vehicle is running, the terminal device acquires a current position based on position information received by the GPS receiver of the communicator 340, reads map information stored in the storage 331 based on the acquired current position, and displays the read map information on the user interface 310.

When destination information is input via the user interface 310, the terminal device searches for a route based on the input destination information and current position information, generates navigation information by matching information about the searched route to map information, and displays the generated navigation information on the user interface 310.

While searching for the route, the terminal device may also receive traffic information from the server 4 and search for the route by using the received traffic information.

Also, the terminal device may search for a plurality of pieces of route information and output the searched route information and the user may select one of the plurality of pieces of route information. In the instant case, the vehicle 1 may generate navigation information by matching the route information selected by the user to the map information.

The terminal device acquires information about a remaining distance and a remaining time to the destination based on navigation information including route information, destination information, and current position information, driving speed information of the vehicle, and traffic information, and displays the acquired information about the remaining distance and the remaining time, and predicts and displays arrival time at the destination.

When the information output mode is the manual mode, the terminal device communicates with the personal mobility device and receives battery charge level information from the personal mobility device.

The terminal device identifies information about an available driving distance corresponding to the battery charge level of the personal mobility device (501).

The terminal device acquires information about at least one parking lot located between the current position and the destination based on route information of navigation information (502).

The terminal device identifies a remaining distance between the at least one parking lot and the destination based on the acquired information about the at least one parking lot and navigation information (503).

Also, when there is a plurality of parking lots, the terminal device identifies a distance between each of the parking lots and the destination based on position information of the parking lots from parking lot information.

The terminal device compares a round trip distance between each parking lot and the destination with the available driving distance of the personal mobility device. When the round trip distance is less than the available driving distance of the personal mobility device, the terminal device identifies the parking lot as a round trip available parking lot, and outputs information about the identified parking lot (504).

The terminal device acquires personal mobility device use information based on information about the round trip available parking lot and destination information, and output the acquired personal mobility device use information (505).

In the instant case, the terminal device outputs information about the round trip available parking lot by the personal mobility device, and information about a travel distance and a travel time to the parking lot in a case of traveling from the current position to the parking lot by the vehicle based on traffic information and current position information.

Also, a plurality of round trip available parking lots, may be identified.

In the instant case, the terminal device may output a plurality of pieces of parking lot information via the user interface 310, and the user may select one of the output plurality of pieces of parking lot information. The terminal device may acquire personal mobility device use information based on the selected parking lot information and navigation information.

The parking lot information output via the user interface 310 may include information about position of the parking lot, distance from the parking lot to the destination, travel time from the parking lot to the destination, parking fee of the parking lot, and parking space of the parking lot.

That is, the terminal device outputs a remaining distance from the parking lot to the destination, a remaining time from the parking lot to the destination, and arrival time at the destination in a case of traveling from the parking lot to the destination by the personal mobility device.

The terminal device may also acquire a plurality of pieces of parking lot information based on current position information and navigation information, acquire information about one-way trip available parking lot based on the acquired parking lot information, destination information, and the available driving distance of the personal mobility device, and output the one-way trip available parking lot information via the user interface 310.

In the instant case, the terminal device may also acquire personal mobility device use information based on the one-way trip available parking lot information and destination information, and output the acquired personal mobility device use information.

The terminal device outputs a window to ask whether to change the transport device to the destination from the current position on the user interface 310.

The terminal device determines whether a transport device change command is received via the user interface 310 (506). Upon determination that the transport device change command is not received, the terminal device acquires vehicle use information based on current position information, destination information, traffic information, and driving speed information of the vehicle and outputs the acquired vehicle use information (507).

In the instant case, the terminal device outputs a remaining distance from the current position to the destination, a remaining time from the current position to the destination, and arrival time at the destination in a case of traveling from the current position to the destination by the vehicle.

Upon determination that the transport device change command is received via the user interface 310, the terminal device may receive current position information (508), adjust the remaining distance and remaining time to the destination based on the received current position information, route information, and traveling speed information of the personal mobility device, and output the adjusted remaining distance and remaining time.

The terminal device may also predict arrival time at the destination based on the remaining distance to the destination and the traveling speed of the personal mobility device, and output the predicted arrival time.

Upon determination that the transport device change command is received via the user interface 310, the terminal device may receive current position information, re-generate route information based on the received current position information and destination information, generate navigation information by matching the re-generated route information to map information, and output the generated navigation information.

In this regard, the re-generated route information is information about a route through which a travel is possible by the personal mobility device.

The terminal device may acquire a travel distance of the personal mobility device based on the receive current position information, adjust the available driving distance of the personal mobility device based on the acquired travel distance, output the adjusted available driving distance (509), and display arrival time at the destination.

The terminal device may receive battery charge level information from the personal mobility device via communication with the personal mobility device and adjust the available driving distance based on the received battery charge level information.

Figure 15:
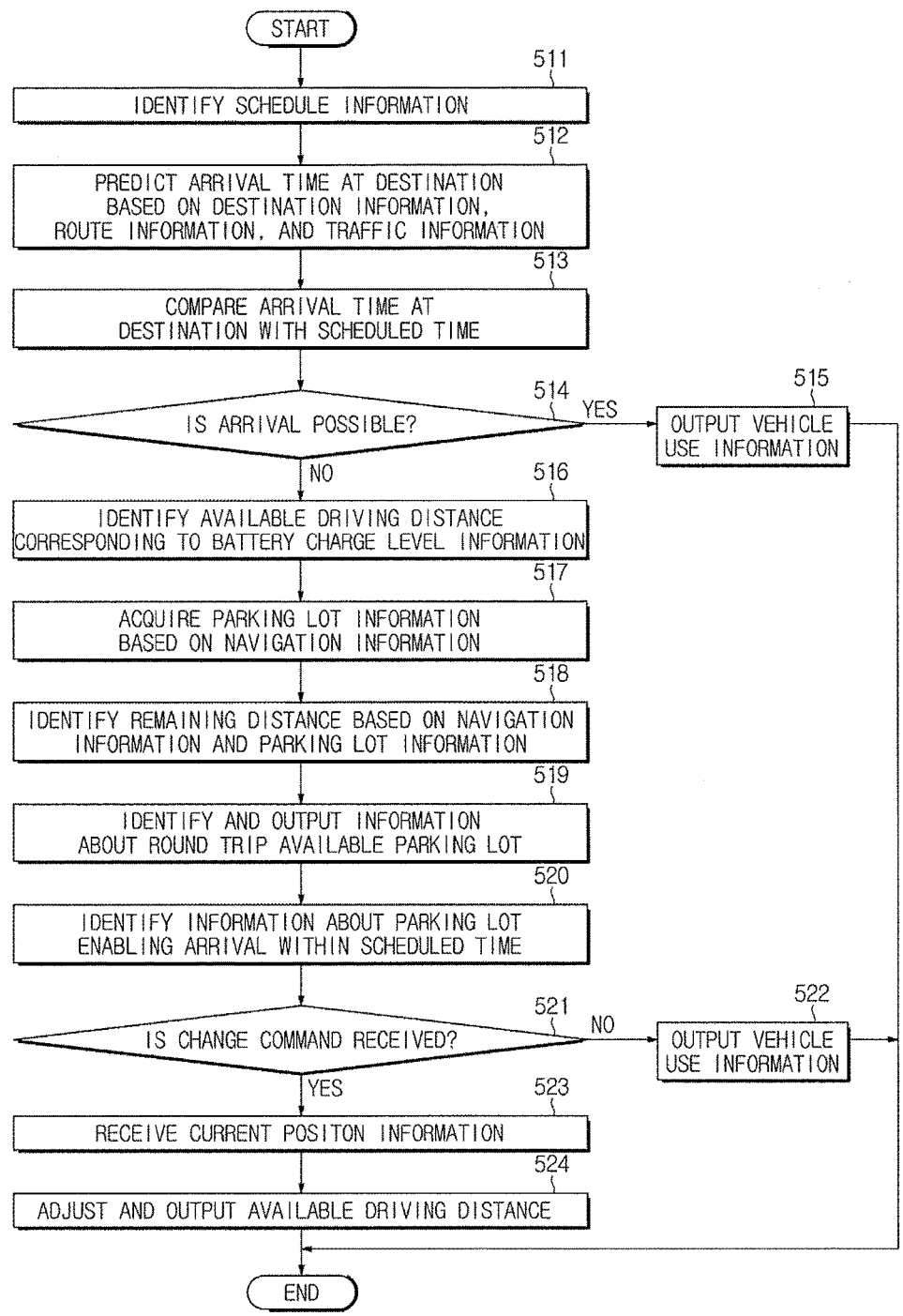
FIG. 15 is a flowchart for describing a process of controlling the terminal device in an automatic information output mode.

FIG. 15 is a flowchart for describing a process of controlling the terminal device in an automatic information output mode.

As illustrated in FIG. 15, the terminal device determines whether the information output mode is the automatic mode while performing the navigation function. When the information output mode is the automatic mode, the terminal device identifies information about the schedule of the user stored in the storage 331 (511).

The information about the schedule of the user includes scheduled time on the basis of destination.

The terminal device predicts arrival time at the destination based on destination information, current position information, route information, traffic information, and current time information (512) and determines the possibility of arriving at the destination within scheduled time (514) by comparing the predicted arrival time with the scheduled time (513).

Upon determination that the arrival at the destination is possible within the scheduled time, the terminal device outputs vehicle use information based on destination information, current position information, route information, and traffic information (515).

That is, the terminal device may output a remaining distance and a remaining time to the destination in a case of traveling by the vehicle and display arrival time at the destination.

Upon determination that the arrival at the destination within the scheduled time is impossible, the terminal device identifies information about an available driving distance of the personal mobility device corresponding to the battery charge level thereof (516).

The terminal device acquires information about at least one parking lot located in a route between the current position and the destination based on current position information and route information of the navigation information (517).

Then, the terminal device identifies a remaining distance between the at least one parking lot and the destination based on the acquired information about the at least one parking lot and destination information (518).

Also, when there is a plurality of parking lots, the terminal device identifies a distance between each of the parking lots and the destination based on position information of the parking lots from parking lot information.

When there is a plurality of parking lots, the terminal device identifies a round trip available parking lot by comparing the distance between each of the parking lots and the destination with the available driving distance, and outputs information about the identified parking lot (519).

Here, information about a plurality of round trip available parking lots may be identified.

The terminal device identifies a distance between the current position and the parking lot and a distance between the parking lot and the destination based on current position information, round trip available parking lot information, and destination information, predicts arrival time at the destination based on the identified distances and a traveling speed of the personal mobility device, and identifies a parking lot enabling the arrival within scheduled time by comparing the predicted arrival time with the scheduled time (520).

Also, when there is a plurality of round trip available parking lots, the terminal device may predict arrival time at the destination from each of the plurality of parking lots.

When there is a plurality of parking lots enabling the arrival at the destination within the scheduled time, the terminal device outputs information about the plurality of parking lots and the user may select one of the parking lots.

That is, the terminal device may output information about the round trip available parking lot enabling the arrival within the scheduled time.

The terminal device acquires personal mobility device use information based on the information about the round trip available parking lot enabling the arrival within the scheduled time, current position information, and destination information and outputs the acquired personal mobility device use information.

The terminal device may also acquire information about the one-way trip available parking lot, based on the information about the plurality of parking lots, destination information, and information about the available driving distance of the personal mobility device, identify a distance between the current position and the parking lot and a distance between the parking lot and the destination based on the acquired information about the one-way trip available parking lot, current position information, and destination information, predict arrival time at the destination based on the identified distances, and identify information about a parking lot enabling the arrival within the scheduled time by comparing the predicted arrival time with the scheduled time.

In the instant case, the terminal device may also acquire personal mobility device use information based on information about the one-way trip available parking lot enabling the arrival at the destination within the scheduled time and destination information, and output the acquired personal mobility device use information.

The terminal device outputs a window to ask whether to change the transport device to the destination on the user interface 310.

The terminal device determines whether a transport device change command is received via the user interface 310 (521). Upon determination that the transport device change command is not received, the transport device acquires vehicle use information based on current position information, destination information, traffic information, and driving speed information of the vehicle and outputs the acquired vehicle use information (522).

In the instant case, the terminal device outputs a remaining distance to the destination, a remaining time to the destination, and arrival time at the destination in a case of traveling from the current position to the destination by the vehicle.

Upon determination that the transport device change command is received via the user interface 310, the terminal device may receive current position information (523), adjust a remaining distance and a remaining time to the destination based on the received current position information, route information, and traveling speed information of the personal mobility device, and output the adjusted remaining distance and remaining time to the destination.

The terminal device may also predict arrival time at the destination based on the remaining distance to the destination and the traveling speed of the personal mobility device, and output the predicted arrival time.

Upon determination that the transport device change command is received via the user interface 310, the terminal device receives current position information, re-generates route information based on the received current position information and destination information, generates navigation information by matching the re-generated route information to map information, and outputs the generated navigation information.

In this regard, the re-generated route information is information about a route through which a travel is possible by the personal mobility device.

The terminal device may acquire a travel distance of the personal mobility device based on the receive current position information, adjust the available driving distance of the personal mobility device based on the acquired travel distance, output the adjusted available driving distance (524), and display arrival time at the destination.

The terminal device 3*a* may also receive battery charge level information from the personal mobility device via communication with the personal mobility device and adjust the available driving distance based on the received battery charge level information.

When there is a traffic jam while traveling to the destination by the vehicle, the terminal device may inform the user of the start position and start time of using the personal mobility device to allow the user to travel to the destination easily and fast by the personal mobility device.

When the vehicle is a bus, the terminal device may acquire a distance from the current position to the destination based on current position information and destination information determined based on bus route information and traffic information, acquire personal mobility device use information based on the acquired distance and a traveling speed of the personal mobility device, and output the acquired personal mobility device use information.

That is, the terminal device may display a remaining distance and a remaining time to the destination, and display arrival time at the destination in a case of traveling from the current position to the destination by the personal mobility device.

Also, the terminal device may acquire information about a best bus stop to get off based on scheduled time included in schedule information of the user and provide the user with the information about the bus stop.

The terminal device identifies bus route information, acquires bus stop information from the bus route information, acquires a distance from each bus stop to the destination based on the acquired bus stop information and destination information, predicts arrival time at the destination from each bus stop based on the acquired distance and a traveling speed of the personal mobility device, acquires information about a bus stop to get off based on the predicted arrival time at the destination when using each bus stop and the scheduled time, and outputs the acquired information about the bus stop.

When the user selects a personal mobility device use information output mode while traveling by a bus or taxi, the terminal device receives battery charge level information from the personal mobility device and identifies an available driving distance thereof corresponding to the received battery charge level.

The terminal device may also periodically receive current position information, periodically acquire a distance between the current position and the destination by comparing current position information with destination information, periodically compare the acquired distance with an available driving distance of the personal mobility device, and output information indicating that the personal mobility device is available upon determination that a travel to the destination by the personal mobility device is possible.

That is, the terminal device may output information about when to get off and when to use the personal mobility device.

Also, upon receiving an input of schedule information of the user, the terminal device identifies scheduled time from the schedule information, periodically receives current position information, periodically acquires a distance between the current position and the destination by comparing current position information with destination information, periodically compares the acquired distance with an available driving distance of the personal mobility device, periodically predicts arrival time at the destination based on the distance between the current position and the destination and a traveling speed of the personal mobility device upon determination that a travel to the destination by the personal mobility device is possible, and periodically compares the predicted arrival time with scheduled time, determining whether the travel from the current position to the destination is possible within the scheduled time.

Here, the speed of the personal mobility device may be one of a maximum speed, a minimum speed, a predetermined speed, and an average speed.

Upon determination that the current position is a position from which the arrival at the destination is possible within the scheduled time, the terminal device outputs information indicating that the personal mobility device is available.

The terminal device may output information about when to get off and when to use the personal mobility device.

As is apparent from the above description, according to an embodiment, the user may select a transport device to use to the destination while traveling to the destination by the vehicle by providing vehicle use information in a case of traveling by the vehicle and personal mobility device use information in a case of traveling by the personal mobility device based on at least one of battery charge level information of the personal mobility device, navigation information, information about traffic conditions around the vehicle to the destination, position information about parking lots nearby, information about the schedule of the user, and information about fuel level of the vehicle.

When the user travels by public transportation or vehicles of others instead of using a vehicle owned by the user, the vehicle use information in a case of traveling by the vehicle and personal mobility device use information in a case of traveling by the personal mobility device are provided via the terminal device of the user so that the user may get off at optimal time. In the instant case, the user may travel to the destination by the personal mobility device at the optimal time.

Thus, the user may arrive at the destination quickly.

When the user travels to the destination by the vehicle having autonomous driving and autonomous parking functions and the personal mobility device, the user may travel to the destination by the personal mobility device at optimal time, reduce a travel time to a parking lot nearby for parking the vehicle before using the personal mobility device by parking the vehicle in the parking lot via autonomous driving and autonomous parking and by transmitting a position where the vehicle is parked to the terminal device, and easily find the vehicle parked via autonomous parking, improving convenience of the user.

According to an embodiment, the vehicle and the personal mobility device may have excellent quality and marketability, high degree of user satisfaction, and high competitiveness by providing vehicle use information and personal mobility device use information while traveling by the vehicle.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle comprising:
an input member configured to receive an input of destination information and an input of an information output mode;
a communicator configured to communicate with a personal mobility device and a terminal device;
a controller configured to communicate with the personal mobility device and the terminal device through the communicator, receive battery charge level information of the personal mobility device, generate navigation information based on the destination information when a navigation function is performed, acquire available driving distance information of the personal mobility device corresponding to the navigation information and the battery charge level information, when the information output mode input by the input member is a manual mode, acquire remaining distance information to the destination based on the navigation information, determine availability of the personal mobility device based on the acquired available driving distance information and the acquired remaining distance information to the destination and control the communicator to transmit the navigation information and a command to communicate with the personal mobility device to the terminal device when the personal mobility device is selected as a transport device via the input member, when the information output mode input by the input member is an automatic mode, identify schedule information of a user, determine availability of the personal mobility device based on scheduled time of the schedule information and traveling speed information of the personal mobility device, and control output of the determined availability; and
a display configured to output the acquired available driving distance information of the personal mobility device and output the determined availability.

2. The vehicle of claim 1, further comprising a speed detector configured to detect a driving speed,
wherein the communicator communicates with a server through the communicator, and the controller receives traffic information from the server, predicts arrival time at a destination in a case of traveling by the vehicle based on the received traffic information, the navigation information, and the detected driving speed, and controls output of the predicted arrival time.

3. The vehicle of claim 1, wherein the controller receives traveling speed information of the personal mobility device, predicts arrival time at a destination in a case of traveling by the personal mobility device based on the received traveling speed information of the personal mobility device and the navigation information, and controls output of the predicted arrival time.

4. The vehicle of claim 3, wherein when the information output mode is the automatic mode, the controller is configured to determine availability of the personal mobility device based on the acquired available driving distance information and the acquired remaining distance information to the destination.

5. The vehicle of claim 1, wherein the controller acquires parking lot information based on the acquired available driving distance information of the personal mobility device and the navigation information, and controls output of the acquired parking lot information.

6. The vehicle of claim 1, wherein the controller identifies available driving distance information of the vehicle corresponding to fuel level information, acquires gas station information based on the navigation information, acquires parking lot information based on the available driving distance information of the vehicle, available driving distance information of the personal mobility device, the navigation information, and the gas station information, and controls output of the acquired parking lot information.

7. The vehicle of claim 1, further including an autonomous driving controller to control autonomous driving and an autonomous parking controller to control autonomous parking,
wherein the controller acquires remaining distance information based on current position information and destination information, is configured to determine availability of the personal mobility device based on the available driving distance information and a remaining distance information, and controls output of information about the determined availability, and when the personal mobility device is selected as transport device, transmits an operation command to the autonomous driving controller and the autonomous parking controller.

8. A terminal device comprising:
an input member configured to receive an input of destination information and an input of an information output mode;
a communicator configured to communicate with a personal mobility device and receive current position information;
a controller configured to receive battery charge level information of the personal mobility device, generate navigation information based on the destination information when a navigation function is performed, acquire remaining distance information to the destination based on the navigation information, acquire available driving distance information of the personal mobility device corresponding to the battery charge level information, predict arrival time at a destination based on the navigation information, the current position information, and traveling speed information of the personal mobility device when the personal mobility device is selected as a transport device via the input member, and controls output of the predicted arrival time; and
a display configured to output the acquired available driving distance information of the personal mobility device use information and output the determined availability,
wherein, when the information output mode input by the input member is an automatic mode, the controller is configured to determine availability of the personal mobility device based on the remaining distance information to the destination, the acquired available driving distance information, scheduled time of schedule information of a user, and the predicted arrival time, and
when the information output mode input by the input member is an manual mode, the controller is configured to determine availability of the personal mobility device based on the remaining distance information to the destination, and the acquired available driving distance information.

9. The terminal device of claim 8, further comprising a speed detector configured to detect a driving speed of a vehicle,
wherein the communicator communicates with a server, and
the controller receives traffic information from the server through the communicator, predicts arrival time at a destination in a case of traveling by the vehicle based on the received traffic information, the navigation information, and the detected driving speed of the vehicle, and controls output of the predicted arrival time.

10. The terminal device of claim 8, wherein the controller acquires parking lot information based on the acquired available driving distance information of the personal mobility device and the navigation information, and controls output of the acquired parking lot information.

11. A personal mobility device comprising:
a battery configured to supply driving power to a motor;
a battery charge level detector configured to detect a battery charge level;
a storage configured to store available driving distance information and available driving time information corresponding to the battery charge level information and store traveling speed information;
a communicator configured to communicate with at least one device of a vehicle and a terminal device;
a controller configured to communicate with the communicator, control the communicator to transmit battery charge level information and the available driving distance information stored in the storage to the at least one device, receive at least one of schedule information of a user and navigation information from the at least one device, when an information output mode input by the at least one device is an automatic mode, control to output first route guidance information to a destination based on the available driving distance information in the storage, scheduled time of the received schedule information of the user, and the received navigation information, and when the information output mode input by the at least one device is an manual mode, control to output second route guidance information to the destination based on the available driving distance information in the storage, and the received navigation information; and
a display configured to display at least one of the available driving distance information, the available driving time information, the first route guidance information and the second route guidance information corresponding to a control command of the controller.

12. The personal mobility device of claim 11, further comprising:
a speed detector configured to detect a traveling speed; and
an input member configured to receive an input of a target speed
wherein the controller is configured to control driving of the motor based on the traveling speed detected by the speed detector and the target speed input by the input member.

13. A method of controlling a vehicle, the method comprising:
generating navigation information based on destination information upon receiving an input of the destination information;
communicating with a personal mobility device;
receiving battery charge level information of a personal mobility device by communicating with the personal mobility device;
identifying available driving distance information of the personal mobility device corresponding to the received battery charge level information;
acquiring remaining distance information to a destination based on the navigation information;
determining availability of the personal mobility device based on the remaining distance information to the destination, and the acquired available driving distance information, when an information output mode input by an input member is an manual mode;
predicting arrival time at a destination by the personal mobility device based on the navigation information, and determining availability of the personal mobility device based on the remaining distance information to the destination, the acquired available driving distance information, scheduled time of schedule information of a user, and the predicted arrival time, when the information output mode input by the input member is an automatic mode;
outputting information about the determined availability;
communicating with a terminal device when the personal mobility device is selected as a transport device via an input member; and
transmitting the navigation information and a command to communicate with the personal mobility device to the terminal device.

14. The method of claim 13, wherein the predicting arrival time at the destination by the personal mobility device comprises:
identifying traveling speed information of the personal mobility device; and
predicting arrival time at the destination in a case of traveling by the personal mobility device based on the navigation information and the traveling speed information of the personal mobility device.

15. A method of controlling a terminal device, the method comprising:
generating navigation information based on destination information upon receiving an input of the destination information;
receiving battery charge level information of a personal mobility device by communicating with the personal mobility device;
identifying available driving distance information of the personal mobility device corresponding to the received battery charge level information;
acquiring remaining distance information to a destination based on the navigation information;
acquiring remaining distance information to a destination based on the navigation information;
determining availability of the personal mobility device based on the remaining distance information to the destination, and the acquired available driving distance information, when an information output mode input by an input member is a manual mode;
predicting arrival time at a destination by the personal mobility device based on the navigation information, and determining availability of the personal mobility device based on the remaining distance information to the destination, the acquired available driving distance information, scheduled time of schedule information of a user, and the predicted arrival time, when the information output mode input by the input member is an automatic mode;
outputting information about the determined availability;
periodically receiving battery charge level information when the personal mobility device is selected as a transport device via an input member;
adjusting the available driving distance based on the received battery charge level information; and
outputting information about the adjusted available driving distance.

16. The method of claim 15, wherein the traveling speed information of the personal mobility device comprises information about a speed detected by a speed detector provided in the terminal device.

17. The method of claim 15, further comprising:
acquiring parking lot information based on the available driving distance information of the personal mobility device and the navigation information; and
controlling output of the acquired parking lot information.

* * * * *